(12) United States Patent
Chaplinsky et al.

(10) Patent No.: US 12,694,055 B2
(45) Date of Patent: Jul. 28, 2026

(54) REAL-TIME ADAPTIVE MUSIC PLAYBACK BASED ON PHYSIOLOGICAL DATA

(71) Applicant: Anhui Huami Health Technology Co., Ltd., Hefei (CN)

(72) Inventors: Ivan Chaplinsky, St. Petersburg (RU); Xiangyu Liu, Coquitlam (CA); Artem Galeev, Vancouver (CA); Yan Vule, Port Moody (CA); Kongqiao Wang, Hefei (CN)

(73) Assignee: Anhui Huami Health Technology Co., Ltd., Hefei (CN)

( * ) Notice: Subject to any disclaimer, the term of this patent is extended or adjusted under 35 U.S.C. 154(b) by 348 days.

(21) Appl. No.: 18/331,618

(22) Filed: Jun. 8, 2023

(65) Prior Publication Data

US 2024/0411807 A1    Dec. 12, 2024

(51) Int. Cl.
*G06F 16/635* (2019.01)
*G06F 3/01* (2006.01)

(52) U.S. Cl.
CPC ............ *G06F 16/636* (2019.01); *G06F 3/011* (2013.01)

(58) Field of Classification Search
CPC .............................. G06F 16/636; G06F 3/011
See application file for complete search history.

(56) References Cited

U.S. PATENT DOCUMENTS

| | | | | |
|---|---|---|---|---|
| 10,572,219 | B2 * | 2/2020 | Garmark | ............ A63B 71/0686 |
| 2015/0378669 | A1 * | 12/2015 | Balassanian | ........... G10H 7/008 |
| | | | | 700/94 |
| 2020/0286505 | A1 * | 9/2020 | Osborne | ................ G06F 16/60 |

FOREIGN PATENT DOCUMENTS

| | | | | |
|---|---|---|---|---|
| KR | 20180015586 | A | * 2/2018 | ............. G06Q 50/10 |

OTHER PUBLICATIONS

Jonathan P. Forsyth; Excerpt of Automatic Musical Accompaniment Using Finite State Machines; PhD Dissertation for Program in Music Technology; Department of Music and Performing Arts Professions; New York University; 2016.

* cited by examiner

*Primary Examiner* — Vivian C Chin
*Assistant Examiner* — Annabelle Kang
(74) *Attorney, Agent, or Firm* — Young Basile Hanlon & MacFarlane, P.C.

(57) ABSTRACT
A first physiological metric associated with a person is identified based on sensor data. A first audio track is identified based on the first physiological metric. The first audio track is then output. The first physiological metric includes at least one of a cadence, a heartrate, a micro-movement, or a respiration rate. A second physiological metric obtained during a playback of the first audio track is identified. A second audio track is identified based on the second physiological metric. The second audio track is output after the first audio track.

17 Claims, 9 Drawing Sheets

255

200
220

215

250

275

260

265

275

270

210

275

205

REAL-TIME ADAPTIVE MUSIC PLAYBACK BASED ON PHYSIOLOGICAL DATA

FIELD

The present disclosure relates generally to real-time adaptive audio playback, and more specifically, to using physiological metrics to identify audio tracks for playback.

SUMMARY

A first aspect is a method for real-time adaptive audio playback. The method includes identifying, based on sensor data, a physiological metric associated with a person; identifying an audio track based on the physiological metric; and outputting the audio track.

A second aspect is a non-transitory computer readable medium storing instructions operable to cause one or more processors to perform operations for personalizing audio playback. The operations include identifying, based on sensor data, a physiological metric associated with a person, wherein the physiological metric includes at least one of a cadence, a heartrate, a micro-movement, and respiration rate; identifying, based on the physiological metric, an audio track; and outputting the audio track.

A third aspect is a system for personalizing audio playback based on physiological changes of a user. The system includes a device that includes a first processor and a server that includes a second processor. The first processor is configured to identify, based on sensor data, a first physiological metric associated with a person at a first time step, transmit the first physiological metric to the server, and output a first audio track. The second processor is configured to identify, based on the first physiological metric, the first audio track based on a mapping of the first physiological metric to first audio characteristics associated with the first audio track, and transmit the first audio track to the device. The first audio characteristics can be associated with one or more audio tracks and can include at least one of an audio tempo, a rhythm, an audio intensity, a timbre, a melody, or a music genre.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
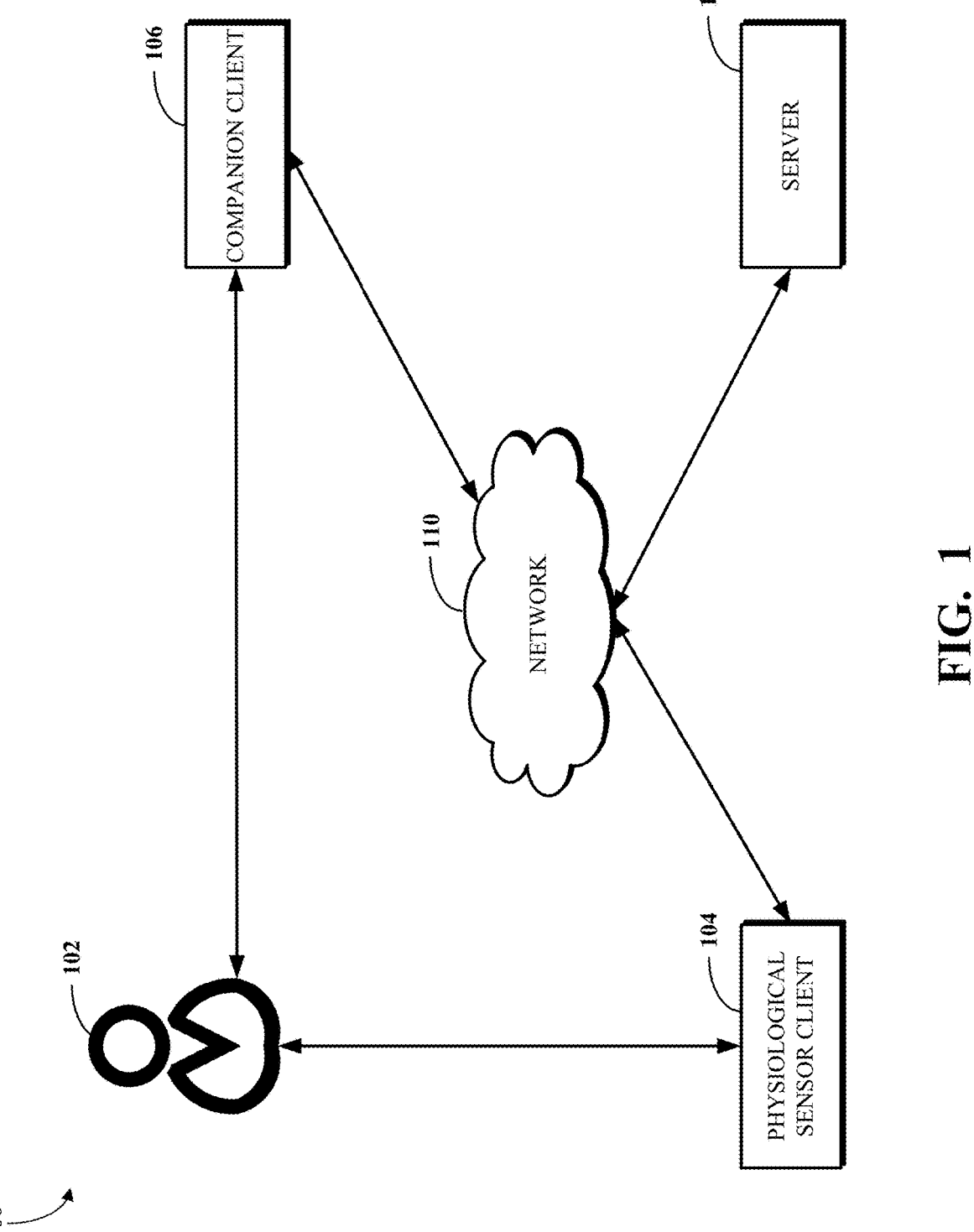
FIG. 1 is a block diagram of an example of an electronic computing and communications system where real-time adaptive audio playback can be used.

The field of music recognition and playback has seen advancements in recent years with the widespread availability of digital music libraries, streaming services, and sophisticated algorithms for analyzing audio signals.

Streaming music services may provide songs to users via the Internet. Users may subscribe to these services and stream music via a web browser or an application. A user may select a genre of music or specific artists to stream. Moreover, users can typically rate songs, and some music services may tailor which songs are streamed to a user based on previous ratings by the user and/or by other users. As such, these service providers provide streaming services including playback of songs based on user input, ratings, genre of music, and the like. Accordingly, the playback of songs based on personalization of music content incorporates general information that has been entered by the user and is unrelated to current measured physiological metrics of a user.

Implementations according to this disclosure provide real-time adaptive playback of music or audio tracks based on physiological data of a person (i.e., user). The physiological data can include physiological metrics and/or physiological parameters. Physiological parameters, as used herein, refers to signals that are directly sensed or received from one or more sensors; and physiological metrics, as used herein, refers to metrics that may be extracted or inferred from the physiological parameters. Playback of music or audio tracks may adapt in real-time to currently extracted (e.g., measured or inferred) physiological metrics and/or measured physiological parameters of a user such as a breathing rate, a heartrate, a respiration rate, blood oxygen saturation, a cadence. "Cadence," as used herein, refers to a measure of a physical activity, such as the number of steps the user has taken over a period of time or movement patterns.

Real-time adaptive playback of music may be based on or use a state transition model that includes states and transitions. The states may correspond to physiological states (e.g., metrics or parameters) and the transitions may correspond to a change from one physiological state to another. A respective cluster of audio tracks (songs or portions thereof) may be associated with (e.g., obtained for) states. A cluster of audio tracks can be associated with one or more audio characteristics and/or the physiological metrics. As such, in response to identifying a physiological state or parameter, corresponding audio tracks may be played.

In some implementations, smooth transition of audio tracks from one state to another may be achieved through classifying or customizing beginning segments and ending segments of the audio tracks. The classification of beginning segment and ending segments of audio tracks and matching such segments of songs with audio characteristics and application of fade-in and fade-out effect can be performed to further enhance the listening experience of the user and to smooth playback.

Implementations according to this disclosure result in improvements to existing or conventional real-time music playback are achieved by providing for enhanced personalization and smooth playback experience through the use of one or more physiological metrics of a user, a state transition model having different groups of audio tracks associated with states and different kinds of transition commands, and/or classification and customization of beginning and ending segments of audio tracks based on (i.e., according to) audio characteristics.

While the systems and devices described herein may be depicted as wrist worn devices, one skilled in the art will appreciate that the systems and methods described below can be implemented in other contexts, including the sensing, measuring, analyzing, and display of physiological data gathered from a device worn at any suitable portion of a body of the user, including but not limited to, other portions of the arm, other extremities, the head, the chest, the abdomen or mid-section, or a combination thereof.

Reference will now be made in detail to certain illustrative implementations, examples of which are illustrated in the accompanying drawings. Wherever possible, the same reference numbers will be used throughout the drawings to refer to the same or like items.

FIG. 1 is a block diagram of an example of an electronic computing and communications system 100 where real-time adaptive audio playback can be used. As can be appreciated the system 100 may include other components, such as load balancers, switches, or databases. The servers may be deployed or implemented in one or more datacenters (not shown in figure). While, for simplicity of explanation, the system 100 is shown as including one user (e.g., the user 102), but more users may be part of the system 100.

A client, such as the physiological sensor client 104 or the companion client 106, may be or otherwise refer to one or both of a device or an application implemented by, executing at, or available at the device. When the client is or refers to a device, the client can include a computing system, which can include one or more computing devices. For example, when the physiological sensor client 104 refers to a device, then the physiological sensor client 104 is a device (e.g., wearable device, sensors) equipped with capabilities of sensing physiological parameters of the user 102 and/or converting such physiological parameters to physiological metrics of the user 102. For example, when the companion client 106 refers to a device, then the companion client 106 may be any device with audio outputting capabilities such as speakers, earphones, earbuds, etc., any computing device with audio outputting capability such as a mobile phone, a tablet computer, a laptop computer, a notebook computer, a desktop computer, or any devices or additional sensors that may assist the physiological sensor client 104 or measure additional physiological parameters. Moreover, the audio outputting capabilities for the companion client 106 can mean to, but do not necessarily have to, include outputting audio, and may instead include transmitting outputting command to the speakers, audio, earphones, etc. that are either embedded or attached to, or communicating with the companion client 106 and/or to external speakers, audio, earphones, etc. Moreover, the companion client 106 may communicate (e.g., wired or wirelessly) with the physiological sensor client 104 and/or the server 108. Where a client instead is or refers to a client application, the client can be an instance of software running on the device. In some implementations, a client can be implemented as a single physical unit or as a combination of physical units. In some implementations, a single physical unit can include multiple clients.

The user 102 is a wearer of the physiological sensor client 104. The physiological sensor client 104 may include user-interface components (e.g., one or more buttons) that the user 102 may interact with (e.g., press) to cause the execution of functionality described herein. In some implementations, the user 102 may interact with the companion client 106 to cause the execution of functionality described herein.

The physiological sensor client 104 may include sensors that can be used to obtain signals (i.e., sensor data) related to one or more physiological parameters of the user 102. The one or more physiological parameters of the user 102 may be or include a heart signal, an electrocardiogramal, parameters related to cadence, micro-movement (i.e., movement of skin or body part caused by respiration, heartbeat, or both), respiration rate, and/or current activities of the user 102, and/or any other feasible parameters suitable to extract physiological metrics of the user 102. The sensor data can be used to extract physiological metrics (e.g., physiological metrics obtained from sensor data obtained from sensors embedded in the physiological sensor client 104 and/or the companion client 106). The sensors may include an accelerometer, a pressure sensor, an optical sensor, an acoustical sensor, an electromagnetic sensor, a contact sensor, an ECG electrode, a bio-impedance sensor, and any other sensors that are suitable to detect physiological parameters. The sensors may also include a microphone, and one or more global positioning system (GPS) sensors.

The sensors can be used to obtain physiological signals (e.g., sensor data) of the user 102. The sensor data can be used to extract companion-derived physiological metrics (i.e., physiological metrics obtained from sensors embedded in the companion client 106). The physiological device-derived physiological metrics, the companion-derived physiological metrics, and any other derived physiological metrics are collectively referred to as "physiological metrics." In some implementations, the companion client 106 may include one or more sensors of the physiological sensor client 104.

The companion client 106 may be, include, or implement an application (not shown in figure) that works in conjunction with the physiological sensor client 104. For example, the application may receive physiological metrics obtained from sensors of the physiological sensor client 104 and identify or cause to be identified (such as by the server 108) an audio track based on such physiological metrics. For example, the application or the device that runs the application can identify the audio track based on a mapping of a physiological metric to audio characteristics associated with the audio track. For example, the audio characteristics may be associated with a group of audio tracks and may include an audio tempo, a rhythm, an audio intensity, a timbre, a melody, and/or a music genre, and the physiological metric can correspond to a group of audio tracks having such audio characteristics. One or more of the steps described in this paragraph may be performed by the application (e.g., software) cooperatively with the server 108. Further, the application may include features for identifying, storing, and/or grouping one or more audio tracks of personal preference by monitoring the behavior of the user in playing audio tracks and using machine-learning model. Stated another way, the behavior of the user may reflect that the user likes classical music and the ambient music, and when the music genre is entered as parameter input representing one or more audio characteristics, the ML model may keep monitoring the user and the ML model be trained to output audio tracks (and/or group the audio tracks) based on the music genre (e.g., classical music genre and the ambient music genre).

The server 108 may be used to identify the audio track based on a mapping of a physiological metric to audio characteristics associated with the audio track. For example, the server 108 may receive the physiological metric from the companion client 106 and/or the physiological sensor client 104, and the server can identify the audio track based on a mapping of a physiological metric to audio characteristics associated with the audio track, such as described above. The server 108 may also be used to train the machine-learning model to output values for audio tracks of personal preference by monitoring the behavior of the user in playing audio tracks. One or more of the steps described in this paragraph may be performed by the server 108 cooperatively with an application (e.g., software) and/or the companion client 106.

The physiological sensor client 104, the companion client 106, and the server 108 may communicate via the network 110. The network 110 can be or include one or more networks. The network 110 can be or include, for example, the internet, a local area network (LAN), a wide area network (WAN), a virtual private network (VPN), or another public or private means of electronic computer communication capable of transferring data between a client and one or more servers. In some implementations, a client can connect to the network 110 via a communal connection point, link, or path, or using a distinct connection point, link, or path. For example, a connection point, link, or path can be wired, wireless, use other communications technologies, or a combination thereof. The network 110 may be a Wi-Fi, a Bluetooth, a ZigBee network, or another type of short distance network. To illustrate, the companion client 106 and the server 108 may communicate over the Internet; and the physiological sensor client 104 and the companion client 106 may communicate via Bluetooth. In some implementations, the physiological sensor client 104 and the server 108 may communicate via the companion client 106. Each of the physiological sensor client 104, the companion client 106, and the server 108 can have a configuration that is at least partially similar to that of the computing device described with respect to FIG. 4.

Figure 2:
FIG. 2 depicts a perspective view of one example device that can detect physiological signals of a person and extract physiological metrics of the person.

FIG. 2 depicts a perspective view of one example device 200 that can detect physiological signals of a person (i.e., a user or wearer) and extract physiological metrics of the person. The device 200 may represent one example of the physiological sensor client 104. The device 200 may be a physiological monitor worn by a user to at least one of sense, collect, monitor, analyze, or display information pertaining to one or more physiological metrics to provide physiological information. The device 200 includes a band, strap, or wristwatch. The device 200 is a wearable monitoring device configured for positioning at a wrist, arm, another extremity of the user, or some other area of the body of the user. The device 200 may be configured to communicate (either wired or wirelessly) with the server 108 and/or the companion client 106 such that information including, but not limited to, physiological parameters, physiological metrics, other information pertaining to physiological metrics and/or profile of the person (e.g., user), sensor signals, and/or sensor data may be transmitted between the companion client 106, server 108, and/or the device 200.

The device 200 may include at least one of an upper module 210 or a lower module 250, each including at least one of one or more sensing tools including sensors and processing tools for detecting, collecting, processing, or displaying one or more physiological parameters and/or physiological metrics of the user and/or other information that may or may not be related to health, wellness, exercise, sleep, or physical training sessions (e.g., characteristic information).

The upper module 210 and the lower module 250 of the device 200 may include a strap or band 205 extending from opposite edges of each module for securing device 200 to the user. The band 205 may include an elastomeric material or the band 205 may include some other suitable material, including but not limited to, a fabric or metal material.

Upper module 210 or lower module 250 may also include a display unit (not shown) for communicating information to the user (i.e., the wearer of the device). The display unit may be an LED indicator that includes a plurality of LEDs, each a different color. The LED indicator can be configured to illuminate in different colors depending on the information being conveyed.

The display unit may include a display screen for displaying images, characters, graphs, waveforms, or a combination thereof to at least one of the user. The display unit may also include one or more hard or soft buttons or switches configured to accept input by the user. The display unit may switch or be toggled between displaying user physiological information. In an example, the user may use the one or more hard or soft buttons or switches to cause and/or initiate real-time adaptive music playback.

The device 200 may also include one or more communication modules. Each of the upper module 210 and the lower module 250 may include a communication module such that information received at either module can be shared with the other module. Through the communication module, the device 200 may communicate (either wired or wirelessly) with a server 108 and/or companion client 106 such that information including at physiological parameters, physiological metrics, and/or other information pertaining to physiological metrics and/or profile of the person (e.g., user), sensor signals and/or sensor data may be transmitted between the companion client 106, server 108, and/or the device 200. The communications between the upper and lower modules can be transmitted from one module to the other wirelessly (e.g., via Bluetooth, RF signal, Wi-Fi, near field communications, etc.) or through one or more electrical connections embedded in band 105. Any analog information collected or analyzed by either module can be translated to digital information for reducing the size of information transfers between modules. Similarly, communications between either module and device can be transmitted wirelessly or through a wired connection, and translated from analog to digital information to reduce the size of data transmissions.

As shown in FIG. 2, lower module 250 can include a sensor array 255 including but not limited to one or more optical detectors 260, one or more light sources 265, one or more contact pressure/tonometry sensors 270, and at least one of the one or more gyroscopes or accelerometers 275. These sensors are only illustrative of the possibilities, however, and lower module may include additional or alternative sensors such as one or more acoustic sensors, electromagnetic sensors, ECG electrodes, bio impedance sensors, or galvanic skin response, or a combination thereof. Though not depicted in the view shown in FIG. 2, upper module 210 may also include one or more such sensors and components on its inside surface, i.e., the surface in contact with a tissue or targeted area of the user.

The location of sensor array 255 or the location of one or more sensor components of sensor array 255 with respect to the tissue of the user may be customized to account for differences in body type across a group of users or placement in different locations on the user. For example, band 205 may include an aperture or channel within which lower module 250 is movably retained. In one implementation, lower module 250 and channel can be configured to allow lower module 250 to slide along the length of channel using, for example, a ridge and groove interface between the two components. For example, if the user desires to place one more components of sensor array 255 at a particular location on his or her wrist, or mid-section, the lower module 250 can be slid into the desired location along band 205. Though not depicted in FIG. 2, band 205 and upper module 210 can be similarly configured to allow for flexible or customized placement of one or more sensor components of upper module 210 with respect to the wrist or targeted tissue area of the user.

The sensors and components proximate or in contact with the at least one of the tissue of the user, upper module 210, or lower module 250 may include additional sensors or components on their respective outer surfaces, i.e., the surfaces facing outward or away from the tissue of the user. In the implementation depicted in FIG. 2, the upper module 210 includes one sensor array 215. The sensor array 215 may include one or more ECG electrodes 220, and/or one or more gyroscopes and/or accelerometers 275. Similar to the sensor arrays of the upper and lower modules proximate or in contact with the tissue of the user, outward facing sensor array 215 may also include one or more contact pressure/tonometry sensors, photo detectors, light sources, acoustic sensors, electromagnetic sensors, bio impedance sensors, accelerometer, gyroscope, galvanic skin response sensors, and/or any other sensors referenced with respect to the physiological sensor client 104.

The outward facing sensors of sensor array 215 can be configured for activation when touched by the user and used to collect additional information. The outward facing sensors may measure without being in direct contact with the user. The outward facing sensors of sensor array 215 may be or include an accelerometer that may monitor movements or micro-movements (e.g., an acceleration or a velocity change) that are transmitted to the sensor through the band or the module moving or being moved or a gyroscope that monitors velocities to determine micro-movements. In an example, where lower module 250 includes one or more optical detectors 260 and light sources 265 for collecting ECG, PPG, or heart rate information of the user, the sensor array 215 of upper module 210 may include ECG electrodes 220 that can be activated when the user places a fingertip in contact with the electrodes. While the optical detectors 260 and light sources 265 of lower module 250 can be used to continuously monitor blood flow of the user, the sensor array 215 of the upper module 210 can be used periodically or intermittently to collect potentially more accurate blood flow information which can be used to supplement or calibrate the measurements collected and analyzed by an inward facing sensor array, the sensor array 255, of lower module 250.

In addition to the inward and outward facing sensors, device 200 may also include additional internal components such as at least one of the as one or more accelerometers or gyroscopic components for determining whether and to what extent the user is in motion (i.e., whether the user is walking, jogging, running, swimming, sitting, or sleeping), breathing rhythm, breathing signals, or a combination thereof of the user. Information collected by at least one of the accelerometer(s) or gyroscopic components can also be used to calculate the number of steps the user has taken over a period of time (e.g., cadence). The activity information may measure movements. The movements measured may be macro-movements such as walking or jogging. The movements may be micro-movements.

Micro-movements may be caused by a surface of the skin or body part of the user being moved due to respiration, heartbeat, or a both. The micro-movements may have a displacement (e.g., length) less than a predetermined displacement in order for at least one of the accelerometer or gyroscope to at least one of the measure or record the micro-movements. For example, when the user is walking, the accelerometer may measure a movement of more than 1 cm. For example, when the accelerometer is configured to detect the user heartbeat and/or respiration, the accelerometer may measure displacements (i.e., micro-movements) in the range of millimeters (e.g., between 4 mm and 10 mm). The micro-movements may be charted in wave form such that the micro-movements are charted with a peak and a valley.

The displacement values may assist a non-transitory computer readable medium or processor in isolating movements caused by multiple sources (e.g., cadence, heartbeat, and respiration). The processor may receive data from at least one of the accelerometer or gyroscope related to movements of the user. The processor may dynamically filter the data. The processor may provide a respiratory signal and/or heartbeat signal regarding the respiration and/or the heart-rate of the user (referred to herein also as acceleration data). The processor may analyze the acceleration data without regard to a position of the device relative to the user or a position of the user. The processor may filter out unwanted signals and isolate only desired signals. For example, the processor may learn which signals are of interest and the processor may analyze only those signals of interest. The processor may be in communication with or include a non-transitory computer-readable medium.

At least one of the upper module 210 or the lower module 250 can be configured to continuously collect data from the user using an inward facing sensor array. However, certain techniques can be employed to reduce power consumption and conserve battery life of device 200. For instance, only one of the upper module 210 or the lower module 250 may continuously collect information. The module may be continuously active, but may wait to collect information when conditions are such that accurate readings are most likely.

For example, when one or more accelerometers or gyroscopic components of device 200 indicate that the user is still, at rest, or sleeping, one or more sensors of at least one of the upper module 210 or the lower module 250 may collect information from the user while artifacts resulting from physical movement are absent. The accelerometer or gyroscope may not begin reading until the heart rate of the user measured by another sensor is below a predetermined limit. For example, if sensor data from the ECG or PPG sensors indicate that the user is moving then, the accelerometer or gyroscope may not be turned on.

In another example, the accelerometer or gyroscope may turn off if macro-movements are detected or a number of macro-movements are detected to be above a threshold amount (e.g., 5 or more movements per minute, 10 or more per minute, 20 or more per minute, 30 or more per minute, or 60 or more per minute). The processor may be configured to remove or filter out macro-movements. Thus, the accelerometer or gyroscope may only measure micro-movements if the macro-movements are below the threshold amount (e.g., 20 or less movements per minute, 10 or less per minute, 5 or less per minute, or 2 or less per minute). Thus, the accelerometer or gyroscope when set, placed, or configured to read micro-movements may only be activated when macro-movements are not present or when macro-movements are infrequent. The accelerometer or gyroscope may measure micro-movements and macro-movements simultaneously and the macro-movements may be considered outliers and may be removed from reporting. Data provided by at least one of the accelerometer or gyroscope may include an x-component, a y-component, a z-component, or a combination of the x/y/z-components within a coordinate system.

The physiological information from the upper module 210, the lower module 250, or both may be graphically displayed or represented by a waveform on a display (not shown) of the device 200. The graphical display may be provided as an output. The output may include physiological information of a user. For example, the information collected may be categorized and then graphically represented as an output or two or more outputs. The one or more outputs may be one or more waveforms, two or more waveforms, or three or more waveforms. The waveforms may be individually created. The waveforms may overlay one another. The waveforms may be created by categorizing the micro-movements. The micro-movements may be categorized by strength of the micro-movements, frequency of the micro-movements, duration of the micro-movements, or a combination thereof. The waveforms may be a one or more waveforms such as a sine wave or a sinusoidal pattern. The output may have one graph having respiration signals and a graph having a heart rate.

Figure 3:
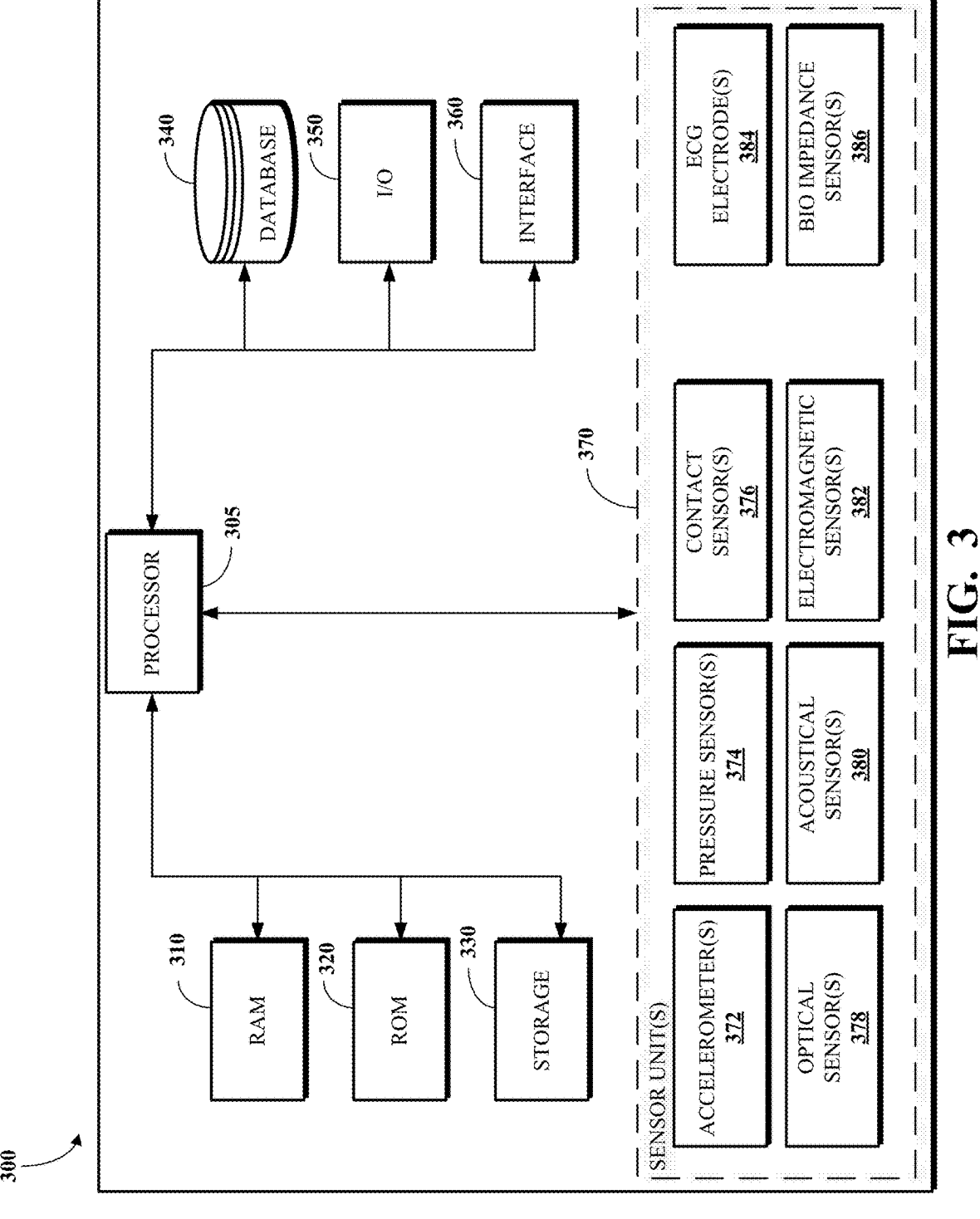
FIG. 3 depicts an illustrative processor-based, computing device 300.

FIG. 3 depicts an illustrative processor-based, computing device 300. The computing device 300 can implement real-time adaptive audio playback. The computing device 300 is representative of the type of computing device that may be present in or used in conjunction with at least some aspects of the physiological sensor client 104 of FIG. 1, the companion client 106 of FIG. 1, the device 200 of FIG. 2, and/or other devices at least partially implementing functionality or techniques described with respect to the system 100 of FIG. 1, or any other device that includes electronic circuitry. For example, the computing device 300 may be used in conjunction with sensing or detecting signals received by one or more sensors of the physiological sensor client 104, the companion client 106, and/or the device 200, processing received signals from one or more components or modules of the physiological sensor client 104, the companion client 106, and/or the device 200 or a secondary device, and identifying, storing, transmitting, outputting, and/or displaying audio tracks and/or information related to audio tracks and the physiological metrics. The computing device 300 is illustrative only and does not exclude the possibility of another processor- or controller-based system being used in or with any of the aforementioned aspects of the physiological sensor client 104, the companion client 106, and the device 200.

In one aspect, the computing device 300 may include one or more hardware and/or software components configured to execute software programs, such as software for obtaining, storing, processing, and analyzing signals, data, or both. For example, the computing device 300 may include one or more hardware components such as, for example, a processor 305, a random-access memory (RAM) 310, a read-only memory (ROM) 320, a storage 330, a database 340, one or more input/output (I/O) modules 350, an interface 360, and the one or more sensor modules 370. Alternatively and/or additionally, the computing device 300 may include one or more software components such as, for example, a computer-readable medium including computer-executable instructions for performing techniques or implement functions of tools consistent for real-time adaptive playback based on physiological data. It is contemplated that one or more of the hardware components listed above may be implemented using software. For example, the storage 330 may include a software partition associated with one or more other hardware components of the computing device 300. The computing device 300 may include additional, fewer, and/or different components than those listed above. It is understood that the components listed above are illustrative only and not intended to be limiting or exclude suitable alternatives or additional components.

The processor 305 may include one or more processors, each configured to execute instructions and process data to perform one or more functions associated with the computing device 300. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 3, the processor 305 may be communicatively coupled to the RAM 310, the ROM 320, the storage 330, the database 340, the I/O module 350, the interface 360, and the one or more sensor modules 370. The processor 305 may be configured to execute sequences of computer program instructions to perform various processes (e.g., techniques), such as those described herein for real-time adaptive playback based on physiological data. The computer program instructions may be loaded into the RAM 310 for execution by the processor 305.

The RAM 310 and the ROM 320 may each include one or more devices for storing information associated with an operation of the computing device 300 and/or the processor 305. For example, the ROM 320 may include a memory device configured to access and store information associated with the computing device 300, including information for identifying, initializing, and monitoring the operation of one or more components and subsystems of the computing device 300. The RAM 310 may include a memory device for storing data associated with one or more operations of the processor 305. For example, the ROM 320 may load instructions into the RAM 310 for execution by the processor 305.

The storage 330 may include any type of storage device configured to store information that the processor 305 may use to perform processes consistent with the disclosed embodiments. The database 340 may include one or more software and/or hardware components that cooperate to store, organize, sort, filter, and/or arrange data used by the computing device 300 and/or the processor 305. For example, the database 340 may include user profile information, historical activity and user-specific information, physiological parameter information, predetermined menu/display options, and other user preferences. Alternatively, the database 340 may store additional and/or different information. The database 340 can be used to store physiological metrics and/or parameters data, a music library, a state transition model, and/or other data used or generated in accordance with implementations of this disclosure.

The I/O module 350 may include one or more components configured to communicate information with a user associated with the computing device 300. For example, the I/O module 350 may comprise one or more buttons, switches, or touchscreens to allow a user to input parameters associated with the computing device 300. The I/O module 350 may also include a display including a graphical user interface (GUI) and/or one or more light sources for outputting information to the user. The I/O module 350 may also include one or more communication channels for connecting the computing device 300 to one or more secondary or peripheral devices such as, for example, a desktop computer, a laptop, a tablet, a smart phone, a flash drive, or a printer, to allow a user to input data to or output data from the computing device 300.

The Interface 360 may include one or more components configured to transmit and receive data via a communication network, such as the Internet, a local area network, a workstation peer-to-peer network, a direct link network, a wireless network, or any other suitable communication channel. For example, the interface 360 may include one or more modulators, demodulators, multiplexers, demultiplexers, network communication devices, wireless devices, antennas, modems, and any other type of device configured to enable data communication via a communication network.

The computing device 300 may further include the one or more sensor modules 370. Any sensor module within the one or more sensor modules may also be employed by or installed on the physiological sensor client 104 and the companion client 106. In one embodiment, the one or more sensor modules 370 may include one or more of an accelerometer(s) 372, a pressure sensor(s) 374, a contact sensor(s) 376, an optical sensor(s) 378, an acoustical sensor(s) 380, an electromagnetic sensor(s) 382, a ECG electrode(s) 384, a bioimpedance sensor(s) 386, and any other sensors that are suitable to detect physiological parameters. These sensors are only illustrative of a few possibilities and the one or more sensor modules 370 may include alternative or additional sensors suitable for use in the physiological sensor client 104 and the companion client 106.

Although the one or more sensor modules are described collectively as the one or more sensor modules 370, any one or more sensors or sensor modules within the physiological sensor client 104 and/or the companion client 106 may operate independently of any one or more other sensors or sensor modules. Moreover, in addition to collecting, transmitting to the processor 305, and receiving from the processor 305 signals or information, any one or more sensors of the one or more sensor module 370 may be configured to collect, transmit, or receive signals or information to and from other components or modules of the computing device 300, including but not limited, to the database 340, the I/O module 350, or the interface 360.

The accelerometer(s) 372 may be used to detect macro-movements and micro-movements associated with or caused by respiration, heartbeat, or both. For example, the accelerometer(s) 372 may be used to determine whether and to what extent the person (e.g., user) is in motion (i.e., whether the user is walking, jogging, running, swimming, sitting, or sleeping), breathing rhythm, breathing signals, or a combination thereof of the user. Information collected by at least one of the accelerometer(s) 372 can also be used to calculate the number of steps the user has taken over a period of time. The movements measured may be macro-movements such as walking or jogging. The movements may be micro-movements, such as described above with respect to FIG. 2.

In some embodiments, and as described above with respect to FIG. 2, the accelerometer(s) 372 may be set, placed, or configured to read micro-movements (e.g., movement of skin or body part caused by respiration, heartbeat, or both) such that it may only be activated when macro-movements are not present (i.e., not detected) or when macro-movements are infrequent (e.g., during sleep state).

For example, the micro-movements may correspond to skin displacements of less than 4 mm and the accelerometer may be configured to only read movement corresponding to such displacement value. The displacement value may assist a device (such as the computing device 300), non-transitory computer readable medium, and/or processor (such as the processor 305) in isolating movements caused by respiration and/or heartbeat. For example, after the processor receives data from the accelerometer, the processor may filter the accelerometer data by removing unwanted signals and providing the desired signal (e.g., respiratory signal and/or heart signal) regarding the respiration and/or heartbeat of the user. The processor may execute instructions to analyze the data without regard to a position of the device relative to the user or a position of the user. To further enhance the accuracy of isolating the signal, a three-axis (or a two-axis) accelerometer may be used, where one axis may provide a more stable output signal than other axes. For example, at any given time during the sleep state of the user, the output of each axis of the accelerometer can be assessed and the clearest signal (relatively higher amplitudes, relatively stable frequencies, etc.) can be selected for respiratory and/or heartbeat analysis (e.g., computation, calculation) and/or extraction of the heartrate.

In some embodiments, the accelerometer(s) 372 may measure (e.g., detect) micro-movements and macro-movements simultaneously and the macro-movements may be considered outliers and may be removed from reporting. Data provided by at least one of the accelerometer or gyroscope may include an x-component, a y-component, a z-component, or a combination of the x/y/z-components within a coordinate system. Same filtering and/or analytical process or technique as described above may be applied to extract heartrate.

The pressure sensor(s) 374 may use a flexible diaphragm or membrane to detect changes in pressure or force applied to the device. For example, the pressure sensor(s) 374 may be used to measure heart rate, respiration rate, and activity levels. The contact sensor(s) 376 may use capacitive or resistive sensing elements to detect the contact or proximity of the device to the skin. For example, the contact sensor(s) 376 can be used to detect the position of the device on the skin and provide information on heart rate and respiration rate.

The optical sensor(s) 378 may use light-sensitive elements to detect changes in light levels and can be used to monitor heart rate by measuring changes in blood flow. The acoustical sensor(s) 380 may use microphones or other sound-sensitive elements to detect changes in sound levels and can be used to monitor respiration rate. The electromagnetic sensor(s) 382 may use magnetic fields or electrical signals to detect changes in physical or biological parameters. For example, the electromagnetic sensor(s) 382 can be used to measure heart rate or activity levels. The ECG electrode(s) 384 may be used in electrocardiograma detect electrical signals generated by the heart. For example, the ECG electrode(s) 384 can be used to measure heart rate and detect arrhythmias. The bioimpedance sensor(s) 386 may use electrical signals to measure changes in the resistance or impedance of biological tissue. The bioimpedance sensor(s) 386 can be used to measure body composition, hydration levels, and other physiological parameters.

Each of these sensors may provide different types of information, and by combining the outputs from multiple sensors, the device 300 can provide a more comprehensive picture of biological metrics of the user. For example, by using accelerometers, pressure sensors, optical sensors, and ECG electrodes, the device 300 can accurately monitor heart rate, respiration rate, activity levels, and other physiological data.

However, different personalization approach based on physiological parameters of the user for real-time adaptive playback may enhance listening experience of the user. Playback of music or audio tracks may adapt in real-time to currently measured physiological parameters of a person (e.g., user) including, in an example, psychological stress, breathing rate, heartrate, body temperature, blood oxygen saturation, cadence, movement patterns, etc. The physiological parameters or signals may be detected by one or more sensors (e.g., embedded in a device worn or affixed to the person). One or more sensors may include any of sensors described above with respect to FIGS. 1-3.

Figure 4:
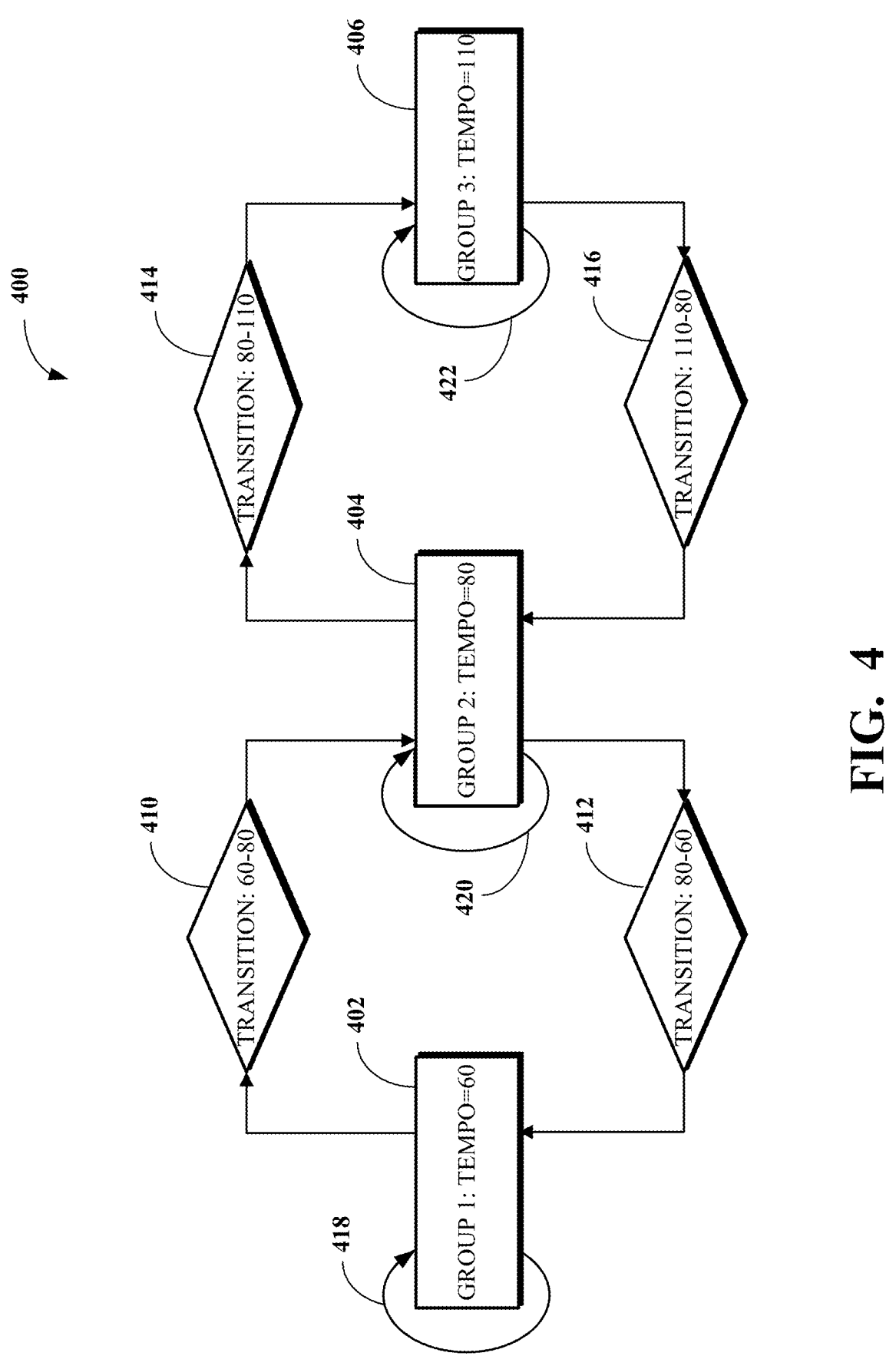
FIG. 4 depicts an example of a state transition model usable for real-time adaptive music playback based on physiological data.

FIG. 4 depicts an example of a state transition model 400 usable for real-time adaptive music playback based on physiological data. Generating or outputting real-time adaptive playback of audio tracks may include adapting audio playback according to the state transition model 400. The state transition model 400 may be, exist, incorporated, or implemented in any suitable format (e.g., file in JavaScript Object Notation (JSON) format or any other format including Extensible Markup Language (XML), Initialization file (INI), Tom's Obvious, Minimal Language (TOML), HashiCorp Configuration Language (HCL) format, etc.) that can be interpreted or processed by executable instructions to generate or output the real-time adaptive playback of the audio tracks.

The state transition model 400 can be implemented, for example, in or as a software program that may be executed by computing devices such as a device that may be in communication with a wearable device having sensors for sensing one or more physiological parameters, or any device that receives physiological metrics, physiological parameters, and/or information about the physiological metrics and/or parameters. For example, the state transition model 400 may be implemented, at least in part, by the physiological sensor client 104 of FIG. 1, the companion client 106 of FIG. 1, the server 108 of FIG. 1, and/or the device 200 of FIG. 2. The state transition model 400 may be implemented in hardware. Moreover, outputting the audio track mat be or include outputting the audible sound and/or transmitting a command to output the audio track, such as to speakers, earphones, or other output devices that are either embedded in, attached to, or in communication with the companion client 106.

The state transition model 400 includes states, such as states 402, 404, and 406; and transitions between different states, such as transitions 410, 412, 414, and 416. Each state can be associated with a group of audio tracks. The group of audio tracks (or, equivalently, each audio track of the group of audio tracks) can be associated with audio characteristics.

In an example, each state can be associated with at least one predefined physiological metric. In this case, in response to obtaining at least one physiological metric of the user, the state with at least one predefined physiological metric in accordance with the at least one physiological metric of the user is determined, and one or more audio tracks of the group of audio tracks associated therewith can be obtained.

In another example, each state can be associated with at least one audio characteristic. In this case, at least one physiological metric can optionally be associated with (e.g., mapped to) at least one audio characteristic. As such, in response to obtaining (e.g., identifying, calculating, or inferring) at least one physiological metric of the user, the audio characteristics associated therewith can be obtained; and in response to obtaining the audio characteristics, one or more audio tracks of the group of audio tracks associated therewith can be obtained. To illustrate, the state 402 may be associated with a heartrate range of 60±10 bpm, the state 404 with a heartrate range of 80±10 bpm, and the state 406 with a heartrate range of 110±20 bpm. As another illustration, the state 402 may be associated with a heartrate range of 40-60 bpm, the state 404 with a heartrate range of 60-80 bpm, and the state 406 with a heartrate range of 80-120 bpm.

In another example, each state can be associated with an effect indicator, or associated with at least one effect indicator for at least one scenario, where each effect indicator of the state for a scenario indicates the effect of the group of audio tracks associated with the state for the scenario, such as a relaxation effect of the group of audio tracks for a relaxation scenario, a sleep aid effect of the group of audio tracks for the sleep aid scenario, a focus effect of the group of audio tracks for a focus scenario, and/or the like. The effect indicator can be obtained by analyzing historical playback information about playing back the group of audio tracks for all users or a part of users, or obtained by analyzing historical playback information about playing back the group of audio tracks for the user, or obtained by analyzing historical playback information about playing back the group of audio tracks for a plurality of users in a user group to which the user belongs. In this case, in response to obtaining at least one physiological metric of the user, current status of the user can be obtained, and the audio track can be selected from a plurality of groups of the audio tracks based on the effect indicator of each group of audio tracks, audio characteristics of the audio tracks as well as the current status of the user. For example, the at least one physiological metric of the user, audio characteristic of the audio tracks as well as the effect indicator of each group of audio tracks are processed by a pre-trained model, to output information about the audio track for the user.

FIG. 4 illustrates that the state 402 is associated with the audio characteristic "TEMPO=60" (i.e., audio tracks having 60 beats per minute), which is associated with the group of audio tracks labeled "GROUP 1;" the state 404 is associated with the audio characteristic "TEMPO-80" (i.e., audio tracks having 80 beats per minute), which is associated with the group of audio tracks labeled "GROUP 2;" and the state 406 is associated with the audio characteristic "TEMPO=110" (i.e., audio tracks having 110 beats per minute), which is associated with the group of audio tracks labeled "GROUP 3."

Each group of audio tracks may include audio tracks (e.g., songs, stream of sound, instrumental piece, etc.) that share the audio characteristic indicated by (e.g., associated with) the state. The audio characteristics may include, but are not limited to, an audio tempo (e.g., beats per time), an audio rhythm (e.g., pattern of beats and/or accents), an audio intensity (e.g., loudness or softness level in dB), a timbre (e.g., tone color), a melody, or a music genre. For example, when the audio characteristics include the tempo, then the groups may be sorted depending on respective tempos of songs. For example, as illustrated in FIG. 4, "GROUP 1" may include audio tracks having an average tempo of 60±10 beats per minute (bpm). "GROUP 2" may include audio tracks having an average tempo of 80±10 bpm, and "GROUP 3" may include audio tracks having an average tempo of 110±20 bpm. As another example, "GROUP 1" may be associated with a tempo range of 40-60 bpm, "GROUP 2" with a tempo range of 60-80 bpm, and "GROUP 3" with a tempo range of 80-120 bpm. In another example, when the audio characteristics include the music genre, "GROUP 1" may include audio tracks of classical music, "GROUP 2" may include audio tracks of jazz music, and "GROUP 3" may include audio tracks of contemporary piano music.

Even though only three groups and one audio characteristic (tempo or music genre) have been provided as examples, the disclosure is not so limited and there may be less than or more than three groups, and grouping can be according to more than one audio characteristic such that respective audio tracks in a respective group may share more than one audio characteristics. Moreover, grouping can be according to audio characteristic other than the tempo or the music genre.

Grouping of audio tracks may be performed in real-time or according to a predetermined configuration. In an example, a grouping of audio tracks can be a logical grouping. That is, an audio track can be considered to be part of a group of audio tracks if the audio track meets the audio characteristics of the group. In an example, an audio characteristic may be a user-selected characteristic. To illustrate, even though an audio track may in fact have a tempo of 80, the user may associate the audio track with the tempo of 60 (i.e., with "GROUP 1"). As such, in an example, the grouping of audio tracks based on one or more audio characteristics may be performed by inputting user input into a user interface of a device running a software or an application (e.g., the companion client 106) that organizes and/or assists in forming a music library (which can also be implemented by or stored in the file that stores the state transition model 400 (e.g., JSON file)).

In some implementations, the grouping of audio tracks based on one or more audio characteristics may be performed by utilizing a machine-learning (ML) model. The ML model can group audio tracks based on inputs and listening behavior of a user. For example, the device that may run the software or the application, such as the physiological sensor client 104, the companion client 106, the server 108, the device 200, and/or the computing device 300, may utilize the ML model to monitor a listening behavior of (e.g., audio track selection by) a user. For example, based on monitored listening behavior of the user and parameter input that represents one or more audio characteristics, the ML model may output the audio tracks that share one or more characteristics and integrates preferences of the user. For example, assuming that the behavior of the user reflects that the user likes classical music and ambient music. When the music genre is entered as parameter input representing one or more audio characteristics, the ML model may keep monitoring the user and the ML model may be trained to output audio tracks (and/or group the audio tracks) based on the music genre (e.g., classical music genre and the ambient music genre). Further, in the same example, the same user may set the parameter input representing one or more audio characteristics to be tempo of 60-80 bpm in addition to the music genre, and the ML model may output (and/or group the songs) based on the classical music having the tempo of 60-80 bpm (e.g., symphonies and concertos) and the ambient music having the tempo of 60-80 bpm.

As such, audio tracks may be grouped into multiple different groups based on one or more audio characteristics and/or preference of the user through manual user input and/or the ML model. Moreover, the same technique for grouping may be applied when forming and/or organizing a music library (which may store the audio tracks that are grouped). The music library may be formed and/or organized by storing music of preference of the user manually through user input and/or by using the ML model. Further, the groups of audio tracks and the music library may be organized, formed, and/or continuously updated in real-time through an online song recommendation engine and/or using the ML model in combination. Such groups and the music library may be stored in a memory, such as the database 340, and/or a cloud storage, such as a server (e.g., the server 108).

The state transition model 400 may be designed in a way such that when implemented by an application or a device, the audio tracks in each group within or implemented by the state transition model 400 may form or be played in an infinite (e.g., repeatedly) playback loop (e.g., as denoted with looping arrows 418, 420, and 422). That is, so long as the physiological metric associated with a current state does not change or changes slightly, then audio tracks associated with the state continue to play. In alternative implementations, the audio tracks in each group may be played in a finite manner (e.g., there is an end point for playback within each group). To illustrate, assume that five audio tracks are identified as being included in "GROUP 1." If after playing the five audio tracks, the physiological metric does not change from that associated with the state 402, then the playback may stop. In an example, if the physiological metric does not change, then at least some of the five audio tracks may be replayed. In another example, even if the physiological metric does not change, then a state transition may be assumed based on an effect indicator associated with the five audio tracks (or equivalently, with the current state) and audio tracks associated with a next state can be played back. To illustrate, if the current state is associated with a relaxation effect, then a transition to a state associated with a deeper relaxation effect may be assumed. In an example, playback may stop after the lapse of a configured timer. To illustrate, the user may configure a playback time of 10 minutes, after which the playback stops.

The physiological sensor client 104 may continuously measure one or more physiological parameters of the person and extract physiological metrics, such as the heartrate, and transmit the physiological metrics to the companion client 106 or any other device and/or application (e.g., physiological sensor client 104 itself as a device or an application, the server 108, the device 200, the computing device 300) that may include the state transition model 400, and the state transition model 400 may determine (e.g., may be used to determine) a group of audio tracks matched with current physiological metrics, and may choose (e.g., may be used to choose) one or more audio tracks from the group for output. For example, when the person has a measured heartrate of 55 bpm, which is associated with "GROUP 1," the audio tracks associated with "GROUP 1" may be output (e.g., played back); and when the person has a measured heartrate of 85 bpm, which is associated with "GROUP 2," the audio tracks associated with "GROUP 2" may be output.

In some implementations, the heartrate may be derived from the micro-movements (e.g., movement of skin or body part caused by respiration, heartbeat, or both) measured by the accelerometer, as described above with respect to the accelerometer(s) of the device 200 of FIG. 2 or the computing device 300 of FIG. 3.

Even though the examples are shown with the audio tempo as an audio characteristic and the heartrate as a physiological metric, combinations of audio characteristics other than the audio tempo, and the physiological metric other than heartrate may be employed or implemented by the state transition model 400. Moreover, even though only three groups and one physiological metric have been provided as examples, there may be less than or more than three groups, and more than one physiological metric may be associated with each group.

The transitions 410-416 may operate on or may be based on changes of physiological metrics of the user extracted or received by the physiological sensor client 104, the companion client 106, the server 108, and/or the device 200. For example, the physiological sensor client 104 may continuously measure one or more physiological parameters of the person and extract physiological metrics of the person, such as the heartrate in this example, and transmit heartrate metric data to the companion client 106 or any other device or application (e.g., physiological sensor client 104 itself as a device and/or an application, the server 108, the device 200, the computing device 300) that included or uses the state transition model 400.

For example, at a first time step, the heartrate of the user may correspond to 65 bpm, which may be associated with the state 402. Accordingly, audio tracks corresponding to "GROUP 1" may be output. At a second time step, while an audio track of "GROUP 1" is being output, the heartrate of the user may be determined to have changed to 85 bpm, which may be associated with the state 404. As such, the transition 410 may take place by instructing or guiding (e.g., through a command or an instruction of the state transition model 400) a device that is running the state transition model 400 to make transition from the state 402 (i.e., from outputting "GROUP 1") to the state 404 such that an audio track of "GROUP 2" may be output after a current audio track being output from "GROUP 1."

Additionally, at third time step, while the audio track of the "GROUP 2" is being outputted, the heartrate of the user may be determined to have changed to 110 bpm, which may be associated with the state 406. As such, the transition 414 may take place by instructing or guiding the device that is running the state transition model 400 to make transition from the state 404 (i.e., from outputting "GROUP2") to the state 406 such that an audio track of "GROUP 3" may be output after a current audio track being output from "GROUP 2."

Additionally, at fourth times step, while the audio track of the "GROUP 3" is being outputted, the heartrate of the user may be determined to have changed to 80 bpm (e.g., the user relaxes during a sleep), which may be associated with the state 404. As such, the transition 416 may take place by instructing or guiding the device that is running the state transition model 400 to make transition from the state 406 (i.e., from outputting "GROUP3") to the state 404 such that an audio track of "GROUP 2" may be output after a current audio track being output from "GROUP 3."

Additionally, at fifth times step, while the audio track of the "GROUP 2" is being outputted, the heartrate of the user may be determined to have changed to 65 bpm, which may be associated with the state 402. As such, the transition 412 may take place by instructing or guiding the device that is running the state transition model 400 to make transition from the state 404 (i.e., from outputting "GROUP2") to the state 402 such that an audio track of "GROUP 1" may be output after a current audio track being output from "GROUP 2."

In cases where the physiological metric (i.e., heart rate) change exceeds the range associated with one or more neighboring states (or one or more groups associated with the neighboring states), an intermediate state (or intermediate group associated with the intermediate state) may be involved. For example, at a first time step, the heartrate of the user may correspond to 55 bpm, and accordingly, audio tracks corresponding to "GROUP 1" may be output. While the audio track corresponding to "GROUP 1" is being outputted, the heartrate of the user may be determined to have changed to 120 bpm at a second time step, which may be associated with the state 406 (i.e., associated with "GROUP3"), but may not be associated with the state 404 (i.e., associated with "GROUP2"). In this scenario, the intermediate state that covers the middle of 55 bpm and the 120 bpm may be state 404 and an audio track of "GROUP 2" may be output after a current audio track being output from "GROUP 1." As such, the transition 410 may take place by instructing or guiding the device that is running the state transition model 400 to make transition from the state 402 (i.e., from outputting "GROUP 1") to the state 404 such that an audio track of "GROUP 2" may be output after a current audio track being output from "GROUP 1." Further, when the intermediate state is involved, the state transition model 400 may be designed such that a shortest track or a track having a length shorter than an average length of audio tracks belonging to a respective group associated with the intermediate state (i.e., "GROUP 2") may be output.

In the same scenario, while the audio track of "GROUP 2" is being outputted, if the heart rate is unchanged at 120 bpm or still remains within the range of state 406 (i.e., associated with "GROUP 3"), then the transition 414 may take place by instructing or guiding the device that is running the state transition model 400 to make transition from the state 404 (i.e., from outputting "GROUP 2") to the state 406 such that an audio track of "GROUP 3" may be output after a current audio track being output from "GROUP 2."

When the heart rate change similarly occurs in an opposite direction (i.e., from 120 bpm to 55 bpm), then the state transitioning may take place in the same manner in an opposite way (i.e., from "GROUP 3" making the transition 414 to "GROUP 2," and from "GROUP 2" making the transition 410 to "GROUP 1").

A state transition model, such as the state transition model 400, may be used in assisting or aiding the user to fall asleep or enhance sleep quality during a sleep. For example, assuming that the ideal tempo for sleep music is typically around 60-80 bpm and the best music genre to aid sleeping are ambient music and nature sound, the audio groups (e.g., "GROUP 1," "GROUP 2," and "GROUP 3") may be first grouped according to two different audio characteristics, namely, the tempo and the music genre. For example, "GROUP 1" may comprise audio tracks that have average tempo of 60-67 bpm, and ambient music and nature sound genre; "GROUP 2" may comprise audio tracks that have average tempo of 68-75 bpm, and ambient music and nature sound genre; and "GROUP 3" may comprise audio tracks that have average tempo of 75-80 bpm, and ambient music and nature sound genre. In addition to two audio characteristics, the state 402 may be associated with the with heartrate of 50-70 bpm, the state 404 may be associated with heartrate of 70-90 bpm, and the state 406 may be associated with heartrate of 90-110 bpm. The transition between each of these groups may occur in the manner described above or in any configurable or feasible way defined or designed in the state transition model 400.

Figure 5:
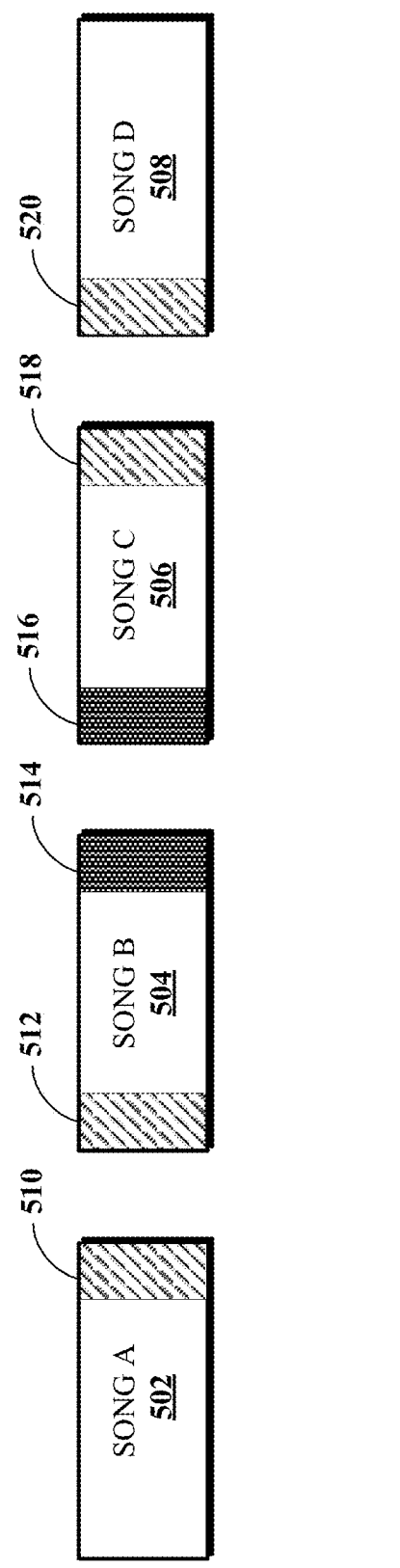
FIG. 5 depicts an example illustration of smoothing transition of audio tracks through classifying and/or customizing beginning segment and ending segment of songs.

In an example, and as further described with respect to FIG. 5, while playback of audio tracks is transitioning from one group of audio tracks to another group of audio tracks, the playback may be smoothed during the transmission.

FIG. 5 depicts an example illustration 500 of smoothing transition of audio tracks through classifying and/or customizing beginning segment and ending segment of songs. The smoothing can be performed (e.g., applied) when transitioning from one state to another. The smoothing can be performed when playing back a song that belongs to a first group of songs associated with a first state (or effect) is completed (or stopped) and a second song that belongs to a different group of songs associated with a second state (or effect) is to begin. The transitions can be pre-defined. In an example, smoothing transitions may be applied to audio tracks in a music library, such as the music library (e.g., the music library implemented or utilized by or within the state transition model 400) described with respect to FIG. 4.

The example illustration 500 includes a song A 502, a song B 504, a song C 506, and a song D 508. Song A includes song A ending segment 510; song B includes song B beginning segment 512 and song B ending segment 514; song C includes song C beginning segment 516 and song C ending segment 518; and song D includes song D beginning segment 520. The term "song" may be used interchangeably with the "audio track."

That a song includes a beginning segment can mean that the beginning segment may not necessarily be part of the song itself but that the beginning segment may be played immediately before the song is played or that the beginning segment may be blended with the beginning of the song. Similarly, that a song includes an ending segment can mean that the ending segment may not necessarily be part of the song itself but that the ending segment may be played immediately after the song is played or that the ending segment may be blended with the ending of the song. In an example, the beginning segment of a song to be played next may be obtained based on an ending portion of an immediately preceding song that is currently planning. In an example, the ending segment of a song that is currently playing may be obtained based on a beginning part of a song that is to be played next.

Segments of a song may correspond to pre-determined or pre-defined portions of the song. The length of each of beginning segments and ending segments of songs may vary depending on the song and/or may be configurable. In a simple example, beginning segment and ending segment of the song may correspond to the first 5 seconds of the song, and the last 5 seconds of the song, respectively. In another example, a user may set the beginning segment of a certain jazz song to have length of 3 seconds of the song and the ending segment of that jazz song to have length of 4 seconds of the song. As such, the length of each of beginning segments and ending segments are configurable.

Each of beginning segments and ending segments of songs may have respective audio characteristics. The audio characteristics may include, but are not limited to, an audio tempo (beats per time), rhythm (e.g., pattern of beats and/or accents), an audio intensity (e.g., loudness or softness level in decibels (dB)), a timbre (e.g., tone color), or a melody. For example, even in a single song, different segments within the song may have different audio tempos. For example, a beginning segment of the song may have average tempo of 70 bpm while an ending segment of the same song may have 60 bpm. In another example, even in a single song, different segments within the song may have different melodies (e.g., musical notes and rhythms, verse and chorus, bridges, etc.).

To smoothly transition between songs, an ending segment of a song may be matched with a beginning segment of a next song to be output. In some implementations, such matching can be done (e.g., performed) by applying fade-out effect to the ending segment of the song and fade-in effect to the beginning segment of the next song to be outputted. For example, the fade-out effect may be applied to the song A ending segment 510 and the fade-in effect may be applied to the song B beginning segment 512.

In some implementations, such matching can be done by matching the audio characteristics. For example, the song B ending segment 514 may have average tempo of 60 bpm and the song C beginning segment 516 may have average tempo of 60 bpm and they can be matched and aligned consecutively as shown in FIG. 5. For example, the song B ending segment 514 may have average tempo that falls within a range of 60-80 bpm and the song C beginning segment 516 may have average tempo that falls within a range of 60-80 bpm and they can be matched and aligned consecutively as shown in FIG. 5. Further, the song C ending segment 518 can be matched with the song D beginning segment 520 by matching one or more audio characteristics and applying the fade-in and fade-out effect at the same time. FIG. 5 is shown for illustrative purposes and matching of ending segment of the song with beginning segment of the next song and aligning them (two or more songs) consecutively may incorporate many different combinations of matching one or more audio characteristics and application of fade-out and fade-in effect.

Such technique of matching ending segment of the song with beginning segment of the next song and aligning them consecutively according to one or more audio characteristics, and/or application of fade-out and fade-in effect may be further applied to in organizing and/or forming the music library (such as the music library discussed with respect to FIG. 4), and audio tracks within each group (e.g., "GROUP 1," "GROUP 2," or "GROUP 3"). Application of such matching and aligning method may ensure smooth playback loop and thus, further enhance quality of listening experience.

For example, when the state transition model 400 is used in assisting or aiding the person to fall asleep or enhance sleep quality during a sleeping stage, each group may comprise audio tracks that have respective average tempo (e.g., 60 bpm for "GROUP 1" or different bpm), and ambient music and nature sound genre (or it could be different genre). In addition to these audio characteristics associated with each group, further applying matching and aligning method to each group may ensure smooth transition and seamless changes between audio tracks within each group, and uninterrupted listening experience.

For example, when the state transition model 400 is used during a non-sleep, physical activity, such as exercise (e.g., jogging, workout session, etc.), each group may comprise audio tracks that have respective average tempo (e.g., 60 bpm for "GROUP 1" or different bpm), and the physiological metric other than the heartrate, such as the cadence, may be employed or implemented by the state transition model 400. In such instance, when the person has a measured cadence of 100-140 steps per minute, which may be associated with "GROUP 1," the audio tracks associated with "GROUP 1" may be output (e.g., played back); when the person has a measured cadence of 140-180 steps per minute, which may be associated with "GROUP 2," the audio tracks associated with "GROUP 2" may be output; and when the person has a measured cadence of 180-220 steps per minute, which may be associated with "GROUP 3," the audio tracks associated with "GROUP 3" may be output. In addition to these audio characteristics associated with each group, further applying matching and aligning method to each group may ensure smooth transition and seamless changes between audio tracks within each group, and uninterrupted listening experience.

For example, when a transition is to be made from one state to another or when a transition is to be made from one group of songs associated with one state to a different group of songs associated with a different state, such transitions, as well as the technique of matching ending segment of the song with beginning segment of the next song and aligning them consecutively according to one or more audio characteristics and/or application of fade-out and fade-in effect can be pre-defined. The transitions can be pre-defined in or according to a state transition model.

Moreover, N applying matching and aligning method may be alternatively implemented by making an external audio track recommendation system to adopt instructions that integrate the matching and aligning method, such that the music library (e.g., the music library discussed with respect to FIG. 4) or storage (either internal storage or at a server) may receive or accept instructions from the external recommendation system to drive these changes.

Figure 6:
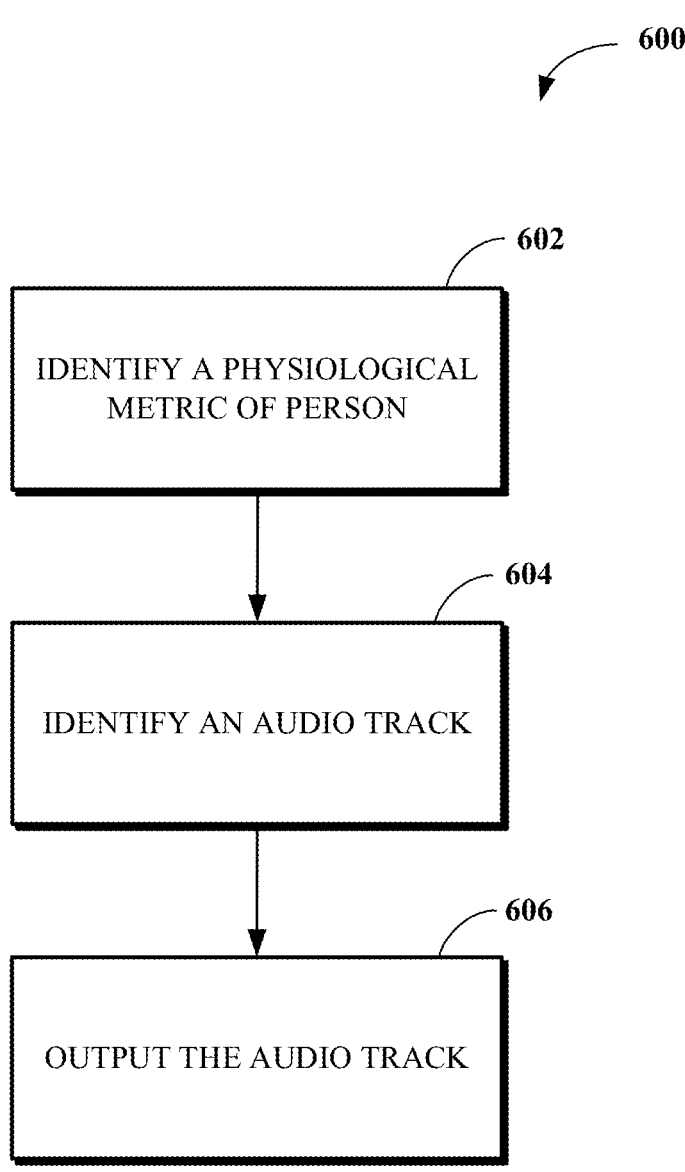
FIG. 6 is a flowchart of an example of a technique for real-time adaptive audio playback based on physiological signal of a user.

FIG. 6 is a flowchart of an example of a technique 600 for real-time adaptive audio playback based on physiological signal of a user. The technique 600 may be implemented by a processor-based device, such as the physiological sensor client 104, the companion client 106, the device 200, the computing device 300, and/or the server 108. The computing device 300 is representative of the type of computing device that may be present in or used in conjunction with at least some aspects of the physiological sensor client 104, the companion client 106, the server 108, or any other device that includes electronic circuitry.

For example, the computing device 300 may be used in conjunction with at least some of receiving sensor data, transmitting sensor data, processing received sensor data to obtain physiological metrics and storing, transmitting, or displaying information. For example, the computing device 300 may be used in conjunction with identifying, storing, transmitting, outputting, and/or displaying audio tracks and/or information related to audio tracks and the physiological metrics. Further, the technique 600 may implement, be implemented by, or in conjunction with the state transition model 400 and/or the example illustration 500.

At 602, one or more physiological metrics of a user, such as the user 102, are identified. The physiological metrics may include at least one of a cadence, a heartrate, a micro-movement, and/or a respiration rate. For example, a device (e.g., the physiological sensor client 104, the companion client 106, the device 200, the computing device 300, etc.) which is equipped with sensors may be used to obtain one or more physiological parameters of the user 102. Then the sensor data (or signals) can be used to extract one or more physiological metrics (e.g., physiological metrics obtained from sensors embedded in the device).

At 604, an audio track is identified based on a physiological metric of the user. For example, the audio track may be identified based on a mapping of the one or more physiological metrics to audio characteristics associated with the audio track. The audio characteristics may be associated with one or more audio tracks and include at least one of an audio tempo, rhythm, audio intensity, timbre, melody, and/or a music genre. For example, the application or the device that runs the application can identify the audio track based on a mapping of a physiological metric to audio characteristics associated with the audio track. The audio characteristics may be associated with a group of audio, and may include audio tempo, rhythm, audio intensity, and/or a music genre, and the physiological metric can correspond to a group of audio tracks having such audio characteristics. For example, when the user has a measured heartrate of 55 bpm, the audio tracks belonging to a group associated with range of heartrate that includes 55 bpm may be identified. The audio track identified may be any one of the audio tracks within such group or could be the audio track that best matches the 55 bpm within such group.

In an example, audio tracks can be identified using the ML model or a deep learning (DL) model. For example, the ML model or the DL model may be trained and utilized to determine one or more of audio characteristics, a state (i.e., one of the states of the state transition model 400), and/or a group (i.e., one of the groups of the state transition model 400) of the audio track based on the physiological metric of the user.

In an example, identifying the audio track based on the physiological metric of the user can include matching the physiological metric of the user to a respective value of the one or more audio characteristics.

In an example, identifying the audio track based on the physiological metric of the user can further include using at least one of a profile information of the user or a scenario information of the user. For example, the profile information can include at least one of age, gender, geographic location, occupation, personality, living habits, circadian rhythm, exercise habits, medical conditions (such as or types of sleep disorders) of the user. For example, the scenario information can indicate a current or anticipated (e.g., imminently to be performed) activity of the user, which can include napping, sleeping, reading, working out, and so on. Moreover, the scenario information can indicate information about a current environment of the user, such as whether the user is currently in a room, home, outdoors, in a well-lit environment, in a noisy environment and a level of noise of the environment (e.g., quiet, medium noise level, loud noise level), and the like.

In an example, identifying the audio track based on the physiological metric of the user can include using a recommendation weight of the user. For example, the recommendation weight of the user may be determined according to data or information related to a listening history of the user, such as feedback obtained, action performed, and/or score obtained with respect to a past playback of the audio track by the user and/or users in a user group.

At 606, the audio track is output. For example, the identified audio track may be outputted to the device itself or to an external device that communicates with the device. Moreover, outputting the audio track may not only include outputting the audible sound but may also include transmitting an outputting command to the speakers, audio, carphones, etc. that are either embedded or attached to, or communicating with the device, and/or to external speakers, audio, carphones, etc.

Figure 7:
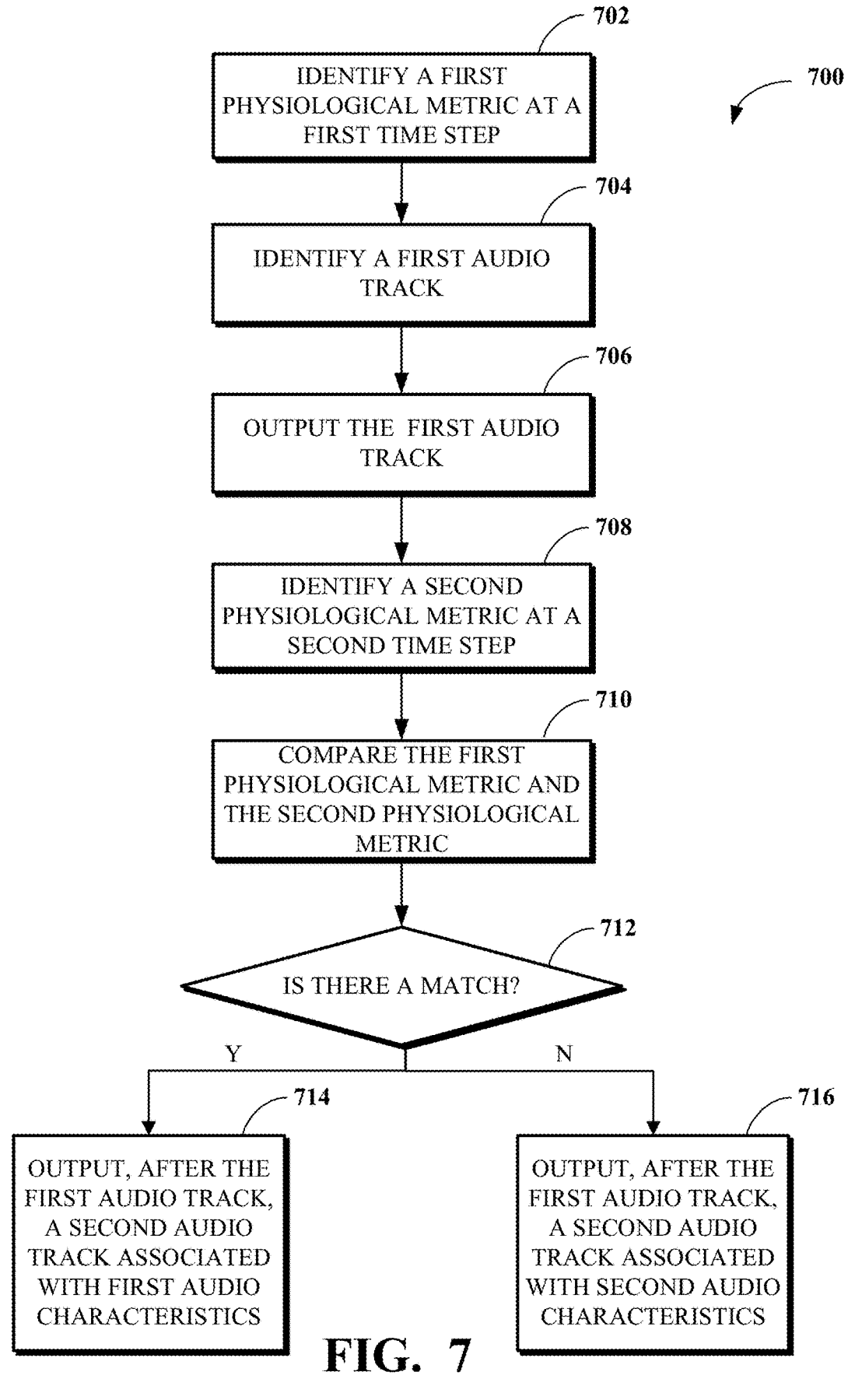
FIG. 7 is a flowchart of an example of a technique for real-time adaptive audio playback based on physiological signal of a user and the state transition model.

FIG. 7 is a flowchart of an example of a technique 700 for real-time adaptive audio playback based on physiological signal of a user and the state transition model 400. The technique 700 may be implemented by a processor-based device, such as the physiological sensor client 104, the companion client 106, the device 200, the computing device 300, and/or the server 108. The computing device 300 is representative of the type of computing device that may be present in or used in conjunction with at least some aspects of the physiological sensor client 104, the companion client 106, the server 108, or any other device that includes electronic circuitry. For example, the computing device 300 may be used in conjunction with at least some of receiving sensor data, transmitting sensor data, processing received sensor data to obtain physiological metrics and storing, transmitting, or displaying information. For example, the computing device 300 may be used in conjunction with identifying, storing, transmitting, outputting, and/or displaying audio tracks and/or information related to audio tracks and the physiological metrics. Further, the technique 700 may implement, be implemented by, or in conjunction with the example illustration 500 and the technique 600.

At 702, a first physiological metric is identified at a first time step. The physiological metric may include at least one of a cadence, a heartrate, a micro-movement, and/or a respiration rate. For example, a device (e.g., the physiological sensor client 104, the companion client 106, the device 200, or the computing device 300), which is equipped with sensors, may be used to continuously obtain one or more physiological parameters of the user, such as the user 102 of FIG. 1. The sensor data (or signals) can be used to extract one or more physiological metrics (e.g., physiological metrics obtained from sensors embedded in the device) at the first time step.

At 704, a first audio track is identified based on the first physiological metric at the first time step. For example, the first audio track can be identified based on a mapping of the one or more physiological metrics to audio characteristics associated with the audio track. The audio characteristics may be associated with one or more audio tracks and include at least one of an audio tempo, rhythm, audio intensity, timbre, melody, and/or a music genre. For example, the application or the device that runs the application can identify the audio track based on a mapping of a physiological metric to audio characteristics associated with the audio track.

To illustrate, at the first time step, the heartrate of the user may correspond to 65 bpm, which may be associated with a first group associated with heartrate of 50-70 bpm and music tempo of 50-70 bpm. As such, the device may search for a group among many groups (or states such as the states of the state transition model 400 of FIG. 4) that most closely matches the observed heartrate, and the first group may be selected as it most closely matches the observed heartrate. Audio tracks corresponding to the first group may be identified at the first time step, and an audio track that belongs to the first group may be identified randomly or that most closely matches the 65 bpm within the first group.

At 706, the first audio track is output. For example, the identified audio track may be output to the device itself, or to an external device that communicates with the device. Moreover, outputting the audio track may not only include outputting the audible sound but may also include transmitting outputting command to the speakers, audio, earphones, etc. that are either embedded or attached to, or communicating with the device, and/or to external speakers, audio, earphones, etc.

At 708, a second physiological metric is identified at a second time step. For example, in the same way or manner as described with respect to step 704, the second physiological metric may be identified at the second time step. For example, the second physiological metric may be obtained during a playback of the first audio track and identified at the second time step.

At 710, the first physiological metric is compared to the second physiological metric. The second physiological metric may be compared to the first physiological metric to determine whether to identify, for output, another audio track associated with second audio characteristics that are different, at least in part, from the first audio characteristics. For example, each of the first physiological metric and the second physiological metric may be associated with or may be a range of values (i.e., a "physiological metric range").

For example, each of the first physiological metric and the second physiological metric may be associated with the same or different groups (such as groups discussed with respect to FIG. 4), in which each group is associated with the range of physiological metric values.

At 712, the technique 700 may determine whether there is a match between the first physiological metric and the second physiological metric. For example, the technique 700 determines whether the first physiological metric and the second physiological metric are within the same the same physiological metric range. For example, the technique 700 may determine whether there is a match between a respective range of values that the first physiological metric belong to and a respective range of values that the second physiological metric belong to. For example, the technique 700 may determine whether there is a match between a respective group having a respective range of values that the first physiological metric belong to and a respective group having a respective range of values that the second physiological metric belongs to.

At 714, if there is a match, the technique 700 outputs, after the first audio track, a second audio track associated with first audio characteristics. For example, if there is a match between a respective group having a respective range of values that the first physiological metric belongs to and a respective group having a respective range of values that the second physiological metric belongs to, then the first audio track and the second audio track may belong to the same group. In this case, there is no transition (e.g., a transition as discussed with respect to FIG. 4) between the first and the second audio tracks, as the second audio track to be played after the first audio track belongs to the same group as the first audio track.

To illustrate, at a first time step, the heartrate of the user may correspond to 65 bpm, which may be associated with a first group associated with heartrate of 50-70 bpm and music tempo of 50-70 bpm. Then an audio track of the first group may be outputted at the first time step. At second time step, while the audio track of the first group is being outputted, the heartrate of the same person may change to 70 bpm, which may still be associated with the first group. Then the transition may not take place and another audio track of the same first group may be outputted immediately after the current first audio track.

At 714, if there is no match, the technique 700 outputs, after the first audio track, a second audio track associated with second audio characteristics. For example, if there is no match between a respective group having a respective range of values that the first physiological metric belongs to and a respective group having a respective range of values that the second physiological metric belongs to, then the first audio track and the second audio track may belong to different groups. In this case, there may be a transition between these two audio tracks, as the second audio track to be played after the first audio track belong to a different group than the group that includes the first audio track. For example, transitioning between these two audio tracks may include transitioning from the first group (that includes the first audio track) to a second group (that includes the second audio track).

To illustrate, at the first time step, the heartrate of the user may correspond to 65 bpm, which may be associated with a first group associated with heartrate of 60±10 bpm and music tempo of 60±10 bpm. Then the audio track corresponding to the first group may be output at the first time step. At a second time step, while the audio track of the first group is being outputted, the heartrate of the same person may change to 85 bpm, which may be associated with a second group associated with a heartrate of 80±10 bpm and a music tempo of 80±10 bpm. Then the transition may take place according to a state transition model, such as the state transition model 400 of FIG. 4.

The audio track may be output to the device itself, or to an external device that communicates with the device. Moreover, outputting the audio track may not only include outputting the audible sound but may also include transmitting outputting command to the speakers, audio, earphones, etc. that are either embedded or attached to, or communicating with the device, and/or to external speakers, audio, earphones, etc.

Figure 8:
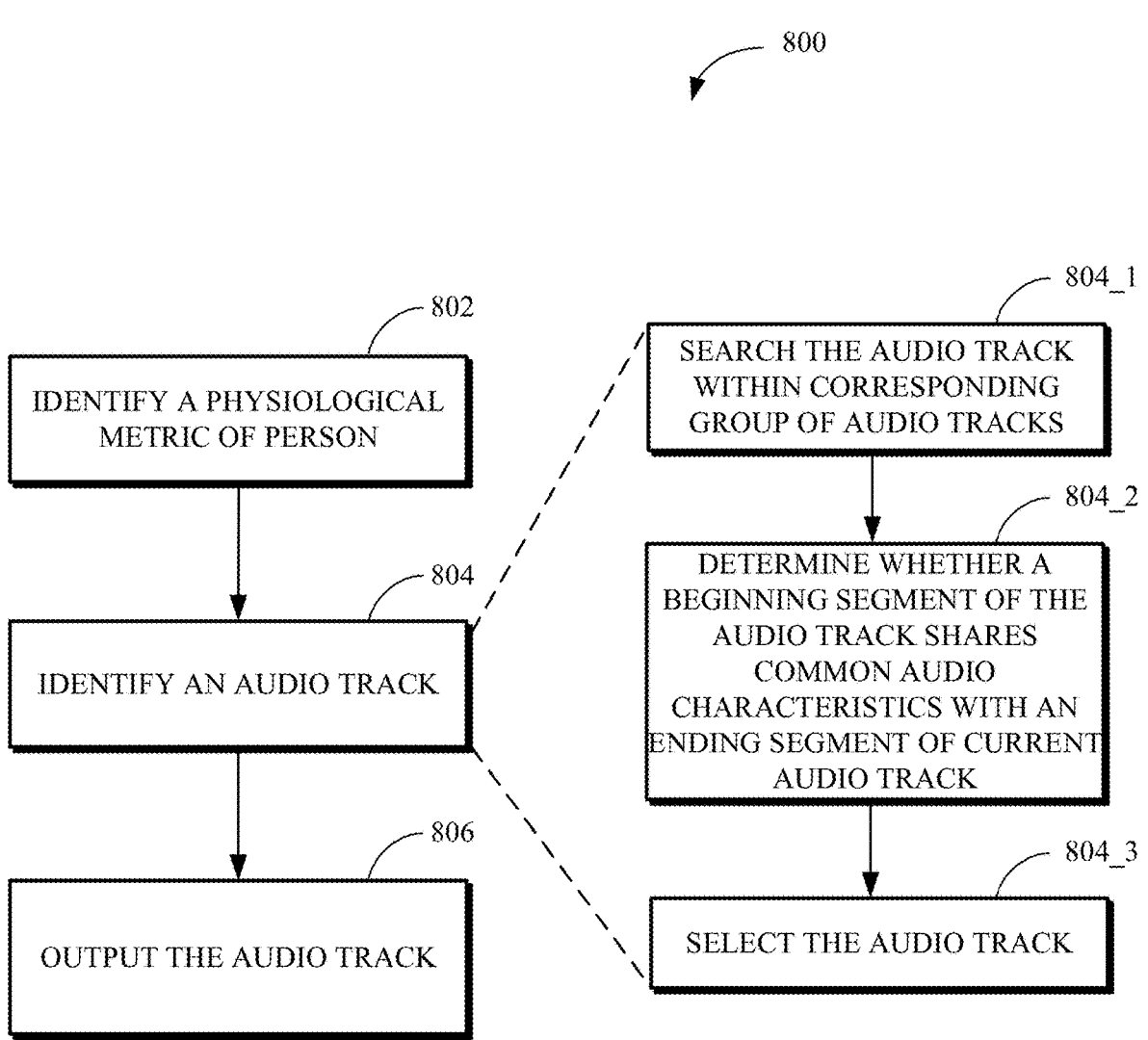
FIG. 8 is a flowchart of an example of a technique for real-time adaptive audio playback utilizing audio segment classification and/or customization.

FIG. 8 is a flowchart of an example of a technique 800 for real-time adaptive audio playback utilizing audio segment classification and/or customization. The technique 800 may be implemented by a processor-based device, such as the physiological sensor client 104, the companion client 106, the device 200, the computing device 300, and/or the server 108. The computing device 300 is representative of the type of computing device that may be present in or used in conjunction with at least some aspects of the physiological sensor client 104, the companion client 106, the server 108, or any other device that includes electronic circuitry. For example, the computing device 300 may be used in conjunction with at least some of receiving sensor data, transmitting sensor data, processing received sensor data to obtain physiological metrics and storing, transmitting, or displaying information. For example, the computing device 300 may be used in conjunction with identifying, storing, transmitting, outputting, and/or displaying audio tracks and/ or information related to audio tracks and the physiological metrics. Further, the technique 800 may implement, be implemented by, or in conjunction with the example illustration 500, the technique 600, and the technique 700.

At 802, one or more physiological metrics of a user, such as the user 102 of FIG. 1, are identified. The one or more physiological metrics may include at least one of a cadence, a heartrate, a micro-movement, and/or a respiration rate. For example, a device (e.g., the physiological sensor client 104, the companion client 106, the device 200, the computing device 300, etc.) which is equipped with sensors may be used to obtain one or more physiological parameters of a person (e.g., user such as the user 102). Then the sensor data (or signals) can be used to extract one or more physiological metrics (e.g., physiological metrics obtained from sensors embedded in the device).

At 804, an audio track is identified. The technique 800 may, either independently or in addition to identifying the audio as described with respect to the technique 600 or the technique 700, perform steps 804_1, 804_2, and 804_3 to identify the audio track. For example, an application or the device that runs the application may be programmed or hardcoded to perform such steps.

At 804_1, the audio track is identified by searching within one or more groups of audio tracks. Searching may be performed through an application or the device that runs the application. For example, the application or the device may search through a music library. The music library may be stored in a database of the device, such as the database 340 of FIG. 3, and/or may be stored in a remote storage, such as a cloud storage, which may be accessible by a server (such as the server 108 of FIG. 1).

At 804_2, the technique 800 determines whether a beginning segment of the audio track shares common audio characteristics with an ending segment of current audio track. Each of beginning segments and ending segments of audio tracks may have respective audio characteristics. The audio characteristics may include, but are not limited to, a tempo (beats per time), rhythm (e.g., pattern of beats and/or accents), an audio intensity (e.g., loudness or softness level in dB), a timbre (e.g., tone color), or a melody. For example, even in a single song, different segments within the song may correspond to or have different features, such as different tempos. For example, a beginning segment of the song may have an average tempo of 70 bpm while an ending segment of the same song may have 60 bpm. In another example, even in a single song, different segments within the song may have different melodies (e.g., musical notes and rhythms, verse and chorus, bridges, etc.).

To ensure a smooth transition of songs, a beginning segment of the audio track may be matched with an ending segment of current audio track with common audio characteristics. For example, the ending segment of a current audio track (i.e., a currently playing audio track) may have an average tempo of 60 bpm and the beginning segment of the audio track may have an average tempo of 60 bpm and they can be matched and aligned consecutively (e.g., as shown in FIG. 5). For example, the ending segment of the current audio track may have an average tempo that falls within a range of 60-80 bpm and the beginning segment of the audio track may have an average tempo that falls within a range of 60-80 bpm, and they can be matched and aligned consecutively.

Further, in some implementations, either after the matching or independently, the technique 800 may optionally apply fade-out effect to the ending segment of the current audio track and fade-in effect to the beginning segment of the audio track to be outputted.

The examples are provided for illustrative purposes and matching of ending segment of the current audio track with beginning segment of the audio track (e.g., next audio track) and aligning them (two or more audio tracks) consecutively may incorporate many different combinations of matching one or more audio characteristics and application of fade-out and fade-in effect.

At 804_3 the technique 800 selects the audio track. For example, the application or the device that runs the application may select the audio track.

At 806, the technique 800 outputs the audio track. For example, selected or identified audio track may be output to the device itself, or to an external device that communicates with the device. Moreover, outputting the audio track may not only include outputting the audible sound but may also include transmitting an outputting command to the speakers, audio, earphones, etc. that are either embedded or attached to, or communicating with the device, and/or to external speakers, audio, earphones, etc.

Figure 9:
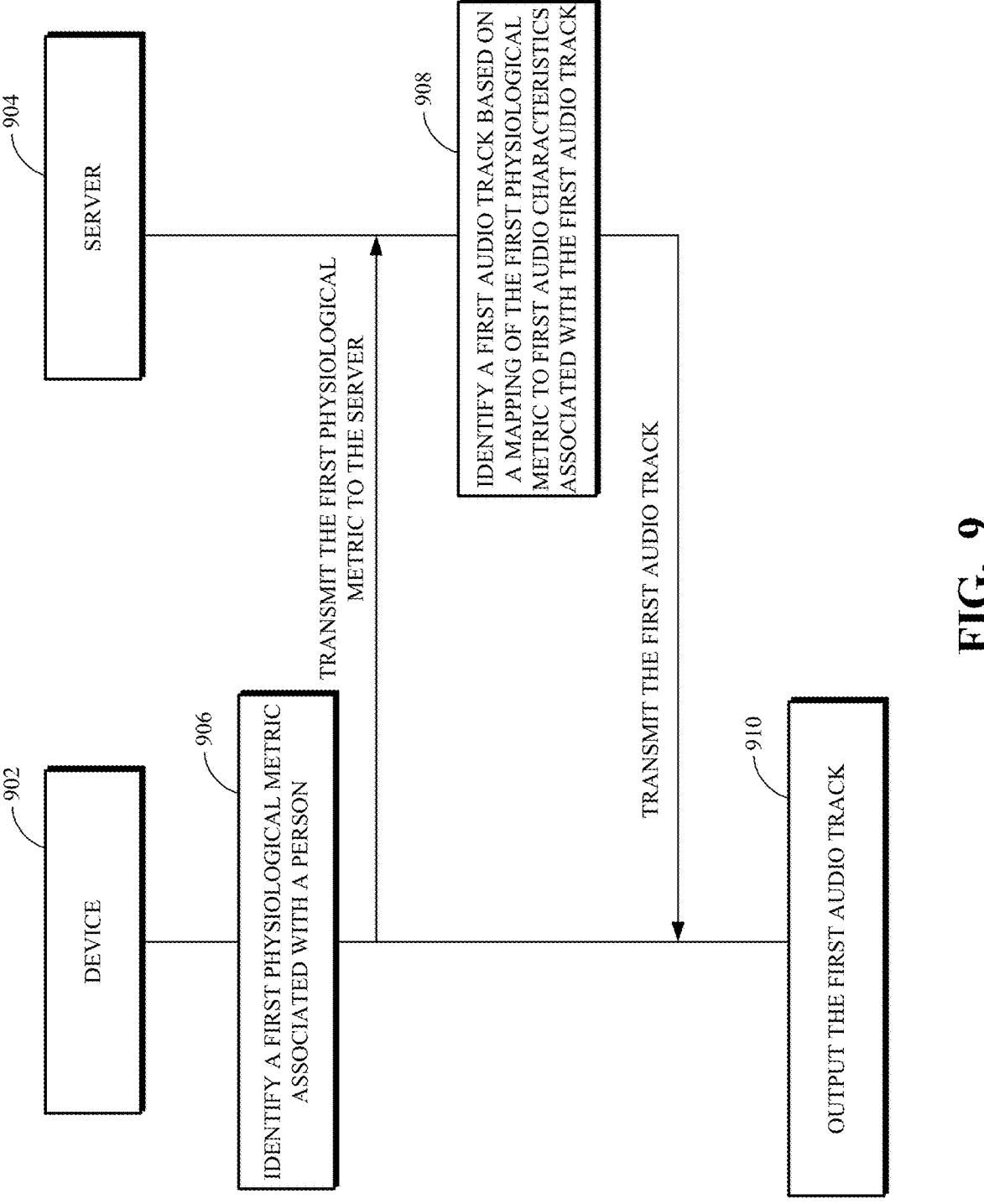
FIG. 9 depicts an interaction diagram for implementing a technique for real-time adaptive audio playback based on physiological signal of a user.

FIG. 9 depicts an interaction diagram 900 for implementing a technique, such as the technique 600, the technique 700, or the technique 800, for real-time adaptive audio playback based on physiological signal of a user.

The interaction diagram 900 includes a device 902 and a server 904. The device 902 may be the physiological sensor client 104, the companion client 106, a combination of both the physiological sensor client 104 and the companion client 106, the device 200, or the computing device 300. The server 904 may be the server 108. The device 902 and the server 904 may communicate via a network, such as the network 110.

At 906, the device 902 may identify a first physiological metric associated with a person. The first physiological metric may include at least one of a cadence, a heartrate, a micro-movement, and/or a respiration rate. For example, the device 902, which is equipped with sensors, may be used to continuously obtain one or more physiological parameters of the user, such as the user 102 of FIG. 1. The sensor data (or signals) can be used to extract one or more physiological metrics (e.g., physiological metrics obtained from sensors embedded in the device) at a first time step.

After the first physiological metric associated with the person is identified at the first time step, the device 902 may transmit the first physiological metric to the server 904 over the network.

At 908, the server 904 identifies a first audio track based on a mapping of the first physiological metric to first audio characteristics associated with the first audio track. The first audio characteristics may be associated with one or more audio tracks and include at least one of an audio tempo, rhythm, audio intensity, timbre, melody, and/or a music genre. After the first audio track is identified, the server 904 transmits the first audio track to the device 902. At 910, the device 902 outputs the first audio track.

While the first audio track is being outputted, the device 902 can identify a second physiological metric associated with the person based on respective sensor data at a second time step. After the second physiological metric is identified, the device 902 can transmit the second physiological metric to the server 904. Then the server 904 can compare the second physiological metric to the first physiological metric to determine whether to identify, for output, another audio track associated with second audio characteristics that are different, at least in part, from the first audio characteristics. The first physiological metric and the second physiological metric are associated with or are respective range of values. In response to determining that the second physiological metric does not match the first physiological metric, the server 904 can transmit the second audio track that is associated with the second audio characteristics to the device 902. Then the device 902 can output the second audio track after the first audio track.

It should be noted that the applications and implementations of this disclosure are not limited to the examples, and alternations, variations, or modifications of the implementations of this disclosure can be achieved for any computation environment.

It may be appreciated that various changes can be made therein without departing from the spirit and scope of the disclosure. Moreover, the various features of the implementations described herein are not mutually exclusive. Rather any feature of any implementation described herein may be incorporated into any other suitable implementation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for adaptive music playback using a wearable device comprising at least one sensor, comprising:

identifying, by at least one processor, at least one first physiological metric associated with a person based on sensor data obtained by the at least one sensor of the wearable device;

selecting, by the at least one processor, a first group of audio tracks from a plurality of groups of audio tracks based on the at least one first physiological metric and an effect indicator associated with each of the plurality of groups of audio tracks, the effect indicator being indicative of at least one of: a relaxation effect, a sleep aid effect, or a focus effect;

outputting a first audio track in the first group of audio tracks;

identifying, by the at least one processor, at least one second physiological metric associated with the person based on additional sensor data obtained by the at least one sensor of the wearable device during playback of the first audio track;

selecting, by the at least one processor, a second audio track based on the at least one second physiological metric; and outputting, after the first audio track, the second audio track, wherein selecting the second audio track based on the at least one second physiological metric comprises at least one of:

in response to determining that the at least one first physiological metric and the at least one second physiological metric are within a same physiological metric range, selecting the second audio track from the first group of audio tracks; or in response to determining that the at least one first physiological metric and the at least one second physiological metric are within different physiological metric ranges, selecting the second audio track in a second group of audio tracks different from the first group of audio tracks.

2. The method of claim 1, wherein selecting, by the at least one processor, the first group of audio tracks from the plurality of groups of audio tracks based on the at least one physiological metric and the effect indicator associated with each of the plurality of groups of audio tracks comprises:

determining a current status of the person based on the first physiological metric; and selecting the first group of audio tracks from the plurality of groups of audio tracks based on the current status of the person and the effect indicator associated with each of the plurality of groups of audio tracks.

3. The method of claim 1, wherein selecting, by the at least one processor, the first group of audio tracks from the plurality of groups of audio tracks based on the at least one physiological metric comprises:

selecting the first group of audio tracks from the plurality of groups of audio tracks based on at least one pre-defined physiological metric associated with each of the plurality of groups of audio tracks and the at least one first physiological metric.

4. The method of claim 1, wherein the at least one physiological metric comprises at least one of a cadence, a heartrate, a micro-movement, or a respiration rate.

5. The method of claim 1, wherein each of the plurality of group of audio tracks comprises at least one audio track sharing a common audio characteristics, and the common audio characteristics comprises at least one of: an audio tempo, an audio rhythm, an audio intensity, a timbre, or a melody.

6. The method of claim 1, wherein each of a beginning segment and an ending segment of the audio tracks is defined based on a music structure comprising at least one of: verse, chorus, or bridge, and a beginning segment of the second audio track has one or more common audio characteristics with an ending segment of the first audio track.

7. The method of claim 1, further comprising:

determining if a status of the person is changed based on additional sensor data obtained during playback of the first audio track by the at least one sensor;

upon determining that the status of the person is changed, selecting, from the plurality of groups of audio tracks, a second group of audio tracks corresponding to the changed status from the plurality of group of audio tracks; and outputting, after the first audio track, a second audio track of the second group of audio tracks.

8. The method of claim 1, wherein selecting the second audio track based on the at least one second physiological metric, further comprise: identifying a second group of audio tracks different from the first group of audio tracks based on the at least one second physiological metric; and selecting the second audio track associated with a transition from the first group of audio tracks to the second group of audio tracks, the second audio track being associated with an audio characteristics between a first audio characteristics associated with the first group of audio tracks and a second audio characteristics associated with the second group of audio tracks.

9. A non-transitory computer readable medium storing instructions operable to cause one or more processors to perform operations for personalizing audio playback using a wearable device comprising at least one sensor, the operations comprising:

identifying, based on sensor data obtained by the at least one sensor of the wearable device, a first physiological metric associated with a person, wherein the first physiological metric includes at least one of a heartrate, a micro-movement, or a respiration rate;

selecting, based on the first physiological metric, a first audio track from a first group of audio tracks, wherein each of the first group of audio tracks is associated with at least one audio characteristics comprising an effect indicator determined by analyzing historical playback information of the first group of audio tracks;

outputting the first audio track;

identifying a second physiological metric obtained from additional sensor data by the at least one sensor during playback of the first audio track;

selecting, by the at least one processor, a second audio track based on the second physiological metric; and outputting, after the first audio track, the second audio track, wherein selecting the second audio track based on the second physiological metric comprises at least one of:

in response to determining that the first physiological metric and the second physiological metric are within a same physiological metric range, selecting the second audio track from the first group of audio tracks; or in response to determining that the physiological metric and the second physiological metric are within different physiological metric ranges, selecting the second audio track in a second group of audio tracks different from the first group of audio tracks.

10. The non-transitory computer readable medium of claim 9, wherein selecting, based on the first physiological metric, the first audio track from the first group of audio tracks further comprises:

identifying the first audio track based on a first physiological metric range comprising the first physiological metric and a first effect indicator associated with the first audio track and mapped to the first physiological metric range.

11. The non-transitory computer readable medium of claim 9, wherein the operations further comprise:

identifying or updating a first effect indicator associated with the first audio track based on additional sensor data obtained by the at least one sensor during playback of the first audio track; and outputting a second audio track selected based on a second effect indicator that is different from the first effect indicator.

12. The non-transitory computer readable medium of claim 9, wherein selecting, based on the first physiological metric, the first audio track from the first group of audio tracks comprises:

Selecting the first group of audio tracks based on the first physiological metric; and selecting the first audio track from at least one audio track comprised in the first group of audio tracks based on a first audio characteristics associated with the first audio track.

13. The non-transitory computer readable medium of claim 9, wherein the operations further comprise:

comparing the second physiological metric to the first physiological metric to determine whether to identify, for output, another audio track associated with second audio characteristics that is different, at least in part, from the first audio characteristics associated with the first audio track.

14. The non-transitory computer readable medium of claim 9, wherein the operations further comprise:

in response to determining that the second physiological metric matches the first physiological metric, outputting, after the first audio track, the second audio track that is associated with a first audio characteristics associated with the first audio track.

15. The non-transitory computer readable medium of claim 14, wherein a fade-in effect is applied to a beginning segment of the second audio track and a fade-out effect is applied to an ending segment of the first audio track.

16. The non-transitory computer readable medium of claim 14, wherein a beginning segment of the second audio track has one or more common audio characteristics with an ending segment of the first audio track, wherein the one or more common audio characteristics include at least one of an audio tempo and rhythm.

17. The non-transitory computer readable medium of claim 9, wherein the operations further comprise:

in response to determining that the second physiological metric does not match the first physiological metric, outputting, after the first audio track, the second audio track that is associated with a second audio characteristics different from a first audio characteristics associated with the first audio track.

* * * * *